United States Patent
Kimura

(10) Patent No.: US 9,552,197 B2
(45) Date of Patent: Jan. 24, 2017

(54) COMPUTER-READABLE RECORDING MEDIUM STORING INFORMATION PROCESSING PROGRAM, INFORMATION PROCESSING APPARATUS, AND INFORMATION PROCESSING METHOD

(71) Applicant: FUJITSU LIMITED, Kawasaki-shi, Kanagawa (JP)

(72) Inventor: Shigeru Kimura, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/840,083

(22) Filed: Aug. 31, 2015

(65) Prior Publication Data
US 2016/0103658 A1    Apr. 14, 2016

(30) Foreign Application Priority Data

Oct. 10, 2014   (JP) .................................. 2014-209309

(51) Int. Cl.
G06F 9/44    (2006.01)
G06F 9/45    (2006.01)

(52) U.S. Cl.
CPC .................................. G06F 8/4442 (2013.01)

(58) Field of Classification Search
None
See application file for complete search history.

(56) References Cited

U.S. PATENT DOCUMENTS 6,681,388 B1 *  1/2004  Sato ........................ G06F 8/453
                                                  717/149

FOREIGN PATENT DOCUMENTS

JP    08-212081    8/1996
JP    2000-112901    4/2000

* cited by examiner

*Primary Examiner* — Qamrun Nahar
(74) *Attorney, Agent, or Firm* — Fujitsu Patent Center

(57) ABSTRACT

A non-transitory computer-readable recording medium stores therein a program for causing an information processing apparatus to execute a process including analyzing a source program with respect to the information processing apparatus that starts hardware prefetching upon detecting an access to a consecutive area on a main storage device and stops the hardware prefetching upon detecting an end of the access to the consecutive area, specifying an array structure in a loop process as a hardware prefetching target, and generating, from the source program, a machine language program in which the array structure is changed so that a second access occurring next to a first access to the array structure refers to an area being consecutive from the area being referred to by the first access.

6 Claims, 37 Drawing Sheets

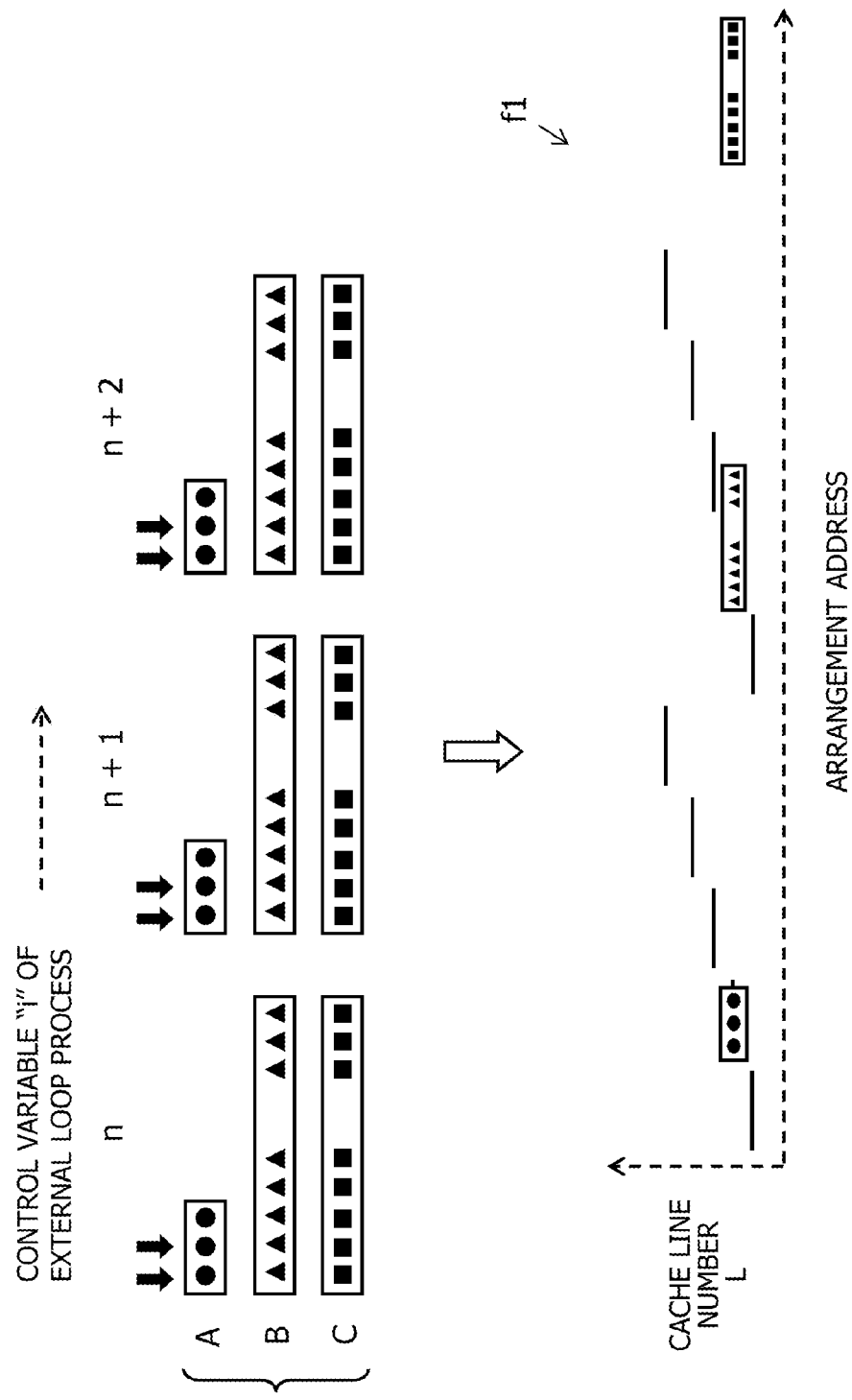

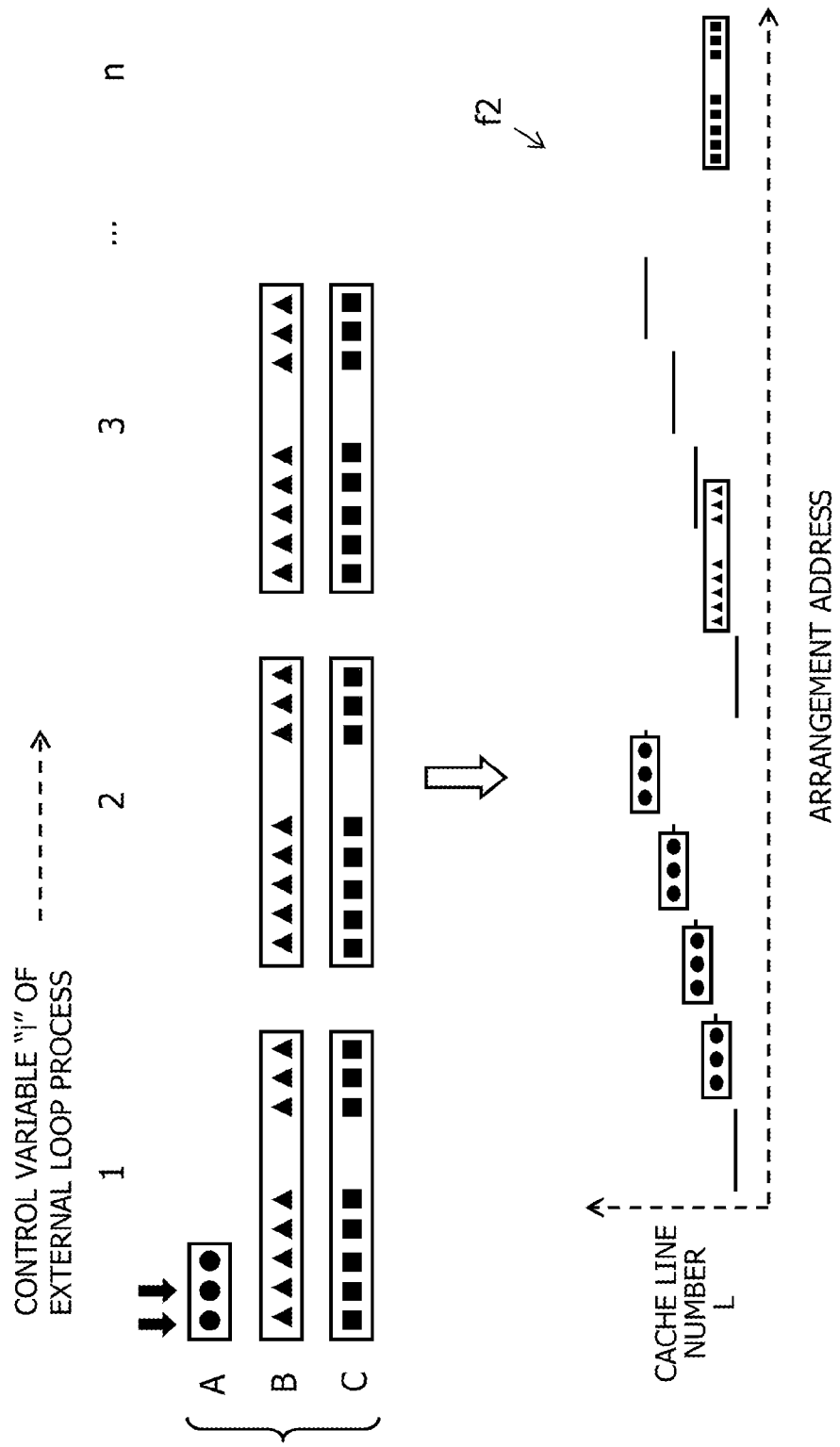

FIG.15C

| ROW NUMBER | NEST LEVEL | CONTROL VARIABLE | INITIAL VALUE | FINAL VALUE | INCREMENT | NAME OF VARIABLE | NEXT NEST MANAGEMENT |
|---|---|---|---|---|---|---|---|
| 120 | 1 | j | 1 | y | 1 | A | | t3

| ROW NUMBER | NEST LEVEL | CONTROL VARIABLE | INITIAL VALUE | FINAL VALUE | INCREMENT | NAME OF VARIABLE | NEXT NEST MANAGEMENT |
|---|---|---|---|---|---|---|---|
| 110 | 2 | i | 1 | x | 1 | ... | | t2

| ROW NUMBER | NEST LEVEL | CONTROL VARIABLE | INITIAL VALUE | FINAL VALUE | INCREMENT | NAME OF VARIABLE | NEXT NEST MANAGEMENT |
|---|---|---|---|---|---|---|---|
| 100 | 3 | k | 1 | z | 1 | ... | | t1

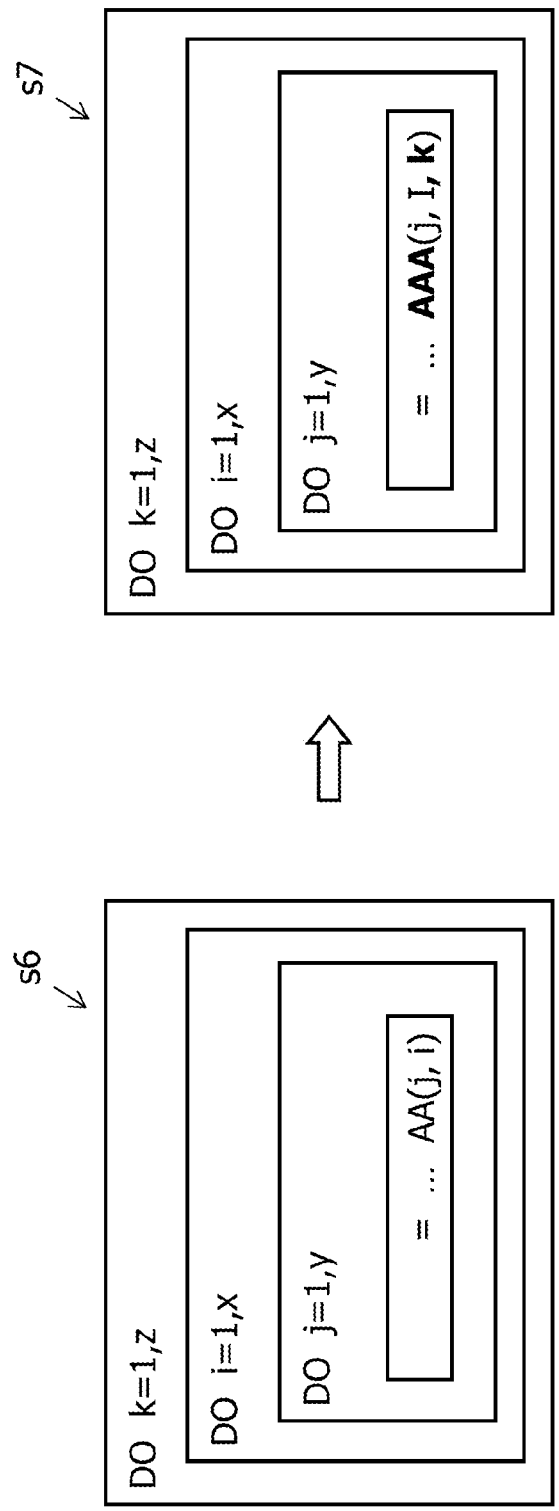

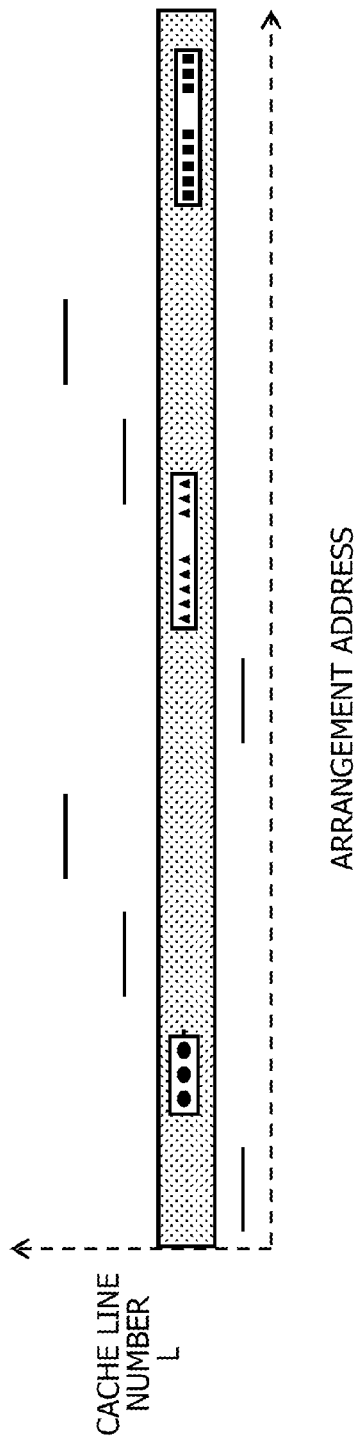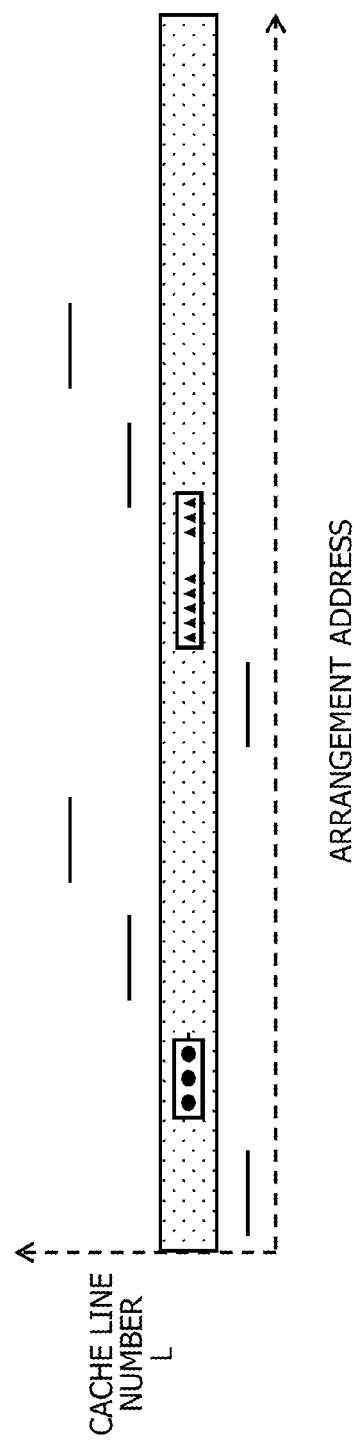

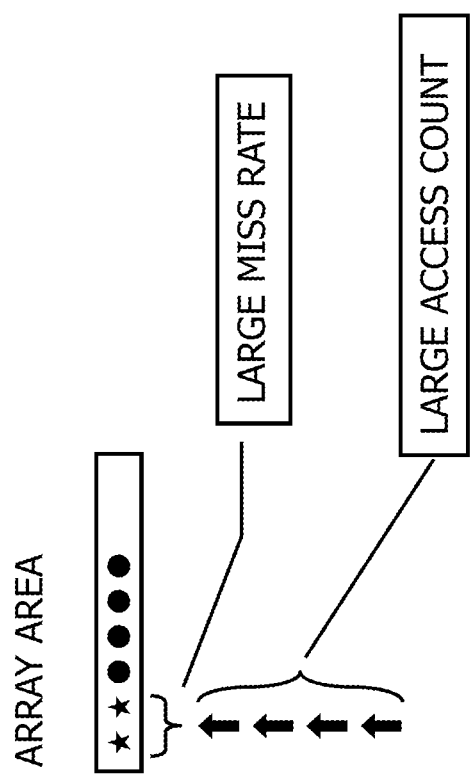

FIG.29

| ARRAY | ACCESS COUNT (L) | CONSECUTIVE ACCESS LENGTH (S) | CACHE CONFLICT DENSITY (R) |
|---|---|---|---|
| array1 | 1000 | 80 | 10 |
| array2 | 2000 | 40 | 20 |
| ... | ... | ... | ... |

COMPUTER-READABLE RECORDING MEDIUM STORING INFORMATION PROCESSING PROGRAM, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2014-209309, filed on Oct. 10, 2014, the entire contents of which are incorporated herein by reference.

FIELD

The embodiments discussed herein are related to a computer-readable recording medium storing an information processing program, an information processing apparatus, and an information processing method.

BACKGROUND

A computer is configured to decrease a period of waiting time for referring to a main memory by disposing a cache memory being higher in speed than the main memory between a processor and the main memory, and retaining data read from the main memory on the cache memory.

However, a numerical calculation process and other equivalent processes using a large-scale data encounter frequent occurrence of cache misses due to low locality of data reference, and are disabled from sufficiently reducing the waiting time for referring to the main memory as the case may be. A known technique for coping with the cache misses described above is a prefetching technique to fetch the data to the cache memory from the main memory in advance of using the data.

The prefetching technique is roughly classified into two types, i.e., software prefetching and hardware prefetching. The software prefetching is a method of preparing a prefetching command for a processor and inserting the prefetching command into a program. On the other hand, the hardware prefetching is a method by which a hardware component dynamically detects a data access pattern, then predicts data to be accessed next, and dynamically prefetches the predicted data.

A known hardware prefetching related technique is a technique of determining a prefetching target data area by automatically detecting a data transfer having continuity in address. Another known technique is a stride prefetching technique of detecting a data access at a fixed interval (which will hereinafter be also termed a stride width).

[Patent document 1] Japanese Laid-Open Patent Publication No. 2000-112901

[Patent document 2] Japanese Laid-Open Patent Publication No. 08-212081

SUMMARY

An aspect of the embodiments is exemplified by a non-transitory computer-readable recording medium stores therein a program for causing an information processing apparatus to execute a process including analyzing a source program with respect to the information processing apparatus that starts hardware prefetching upon detecting an access to a consecutive area on a main storage device and stops the hardware prefetching upon detecting an end of the access to the consecutive area, specifying an array structure in a loop process as a hardware prefetching target, and generating, from the source program, a machine language program in which the array structure is changed so that a second access occurring next to a first access to the array structure refers to an area being consecutive from the area being referred to by the first access.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 10B is a diagram illustrating an example of a memory access image when the conflict occurs on the cache line;

FIG. 11B is a diagram illustrating an example of an image of the access when avoiding the conflict on the cache line;

FIG. 15C is a diagram illustrating one example of a data structure of a DO management table;

FIG. 17 is a diagram illustrating an example of a source code to multi-dimensionalize a two-dimensional array into a three-dimensional array;

FIG. 27A is a diagram illustrating an example of causing the conflict on the cache line;

FIG. 27B is a diagram illustrating an example of not causing the conflict on the cache line;

FIG. 28 is a diagram illustrating an example of the occurrence of the cache miss;

FIG. 29 is a diagram illustrating one example of a data structure of attributes for evaluating a performance improving effect;

DESCRIPTION OF EMBODIMENTS

When a cache miss occurrence count to access the consecutive area reaches a threshold value n, the hardware prefetching starts, and in the case of this method, unnecessary prefetching is executed even after finishing the access to the consecutive area when the threshold value n is small. Therefore, a memory band width might be compressed. Whereas when the threshold value n is large, there is an increased period of warmup time till starting the hardware prefetching, a read delay due to the cache miss does not become concealed.

The adequate threshold value n depends on an average length of the consecutive area to be accessed from a program, and, however, the access to the consecutive area is finished during the warmup time depending on a length of the consecutive area, resulting in no acquisition of a hardware prefetching effect.

Further, when repeatedly accessing the same area, such a problem arises that the hardware prefetching stops. For example, in a loop process including an array, when the processing loops back to a head of the loop, the access to the array also loops back to the head but does not become the access to the consecutive area any more, resulting in a stop of the hardware prefetching. The cache miss occurs when the array data are swept out of the cache memory due to the access to another variable. The occurrence of the cache miss becomes a factor of declined performance.

Moreover, plural items of data being referred to during the repetitive process are allocated to the same cache line, whereby a problem of cache line conflict arises. For example, it is assumed that three arrays A, B and C are allocated to the same cache line, in which a number of Ways of the cache memory is set to "2". The number of Ways is defined as a number of memory blocks that can be retained in parallel when a plurality of memory blocks is allocated to the same cache line.

When the array B and the array C are referred to after referring to the array A, the data of the arrays B and C conflict with the data of the array A because of the number of Ways being "2". The data of the array A, which is longer in time of not being referred to than other arrays, is swept out of the cache line. When next accessing the data of the array A, a cache miss occurs.

With alternate iteration of these processes, the cache miss occurs whenever accessing the head of the array A. An operation of the data being frequently swept out of the cache is called cache thrashing, which becomes a factor of declined performance.

Embodiments of the present invention will hereinafter be described based on the drawings. Configurations of the following embodiments are exemplifications, and the present invention is not limited to the configurations of the embodiments.

<Hardware Prefetching Mechanism>

Figure 1:
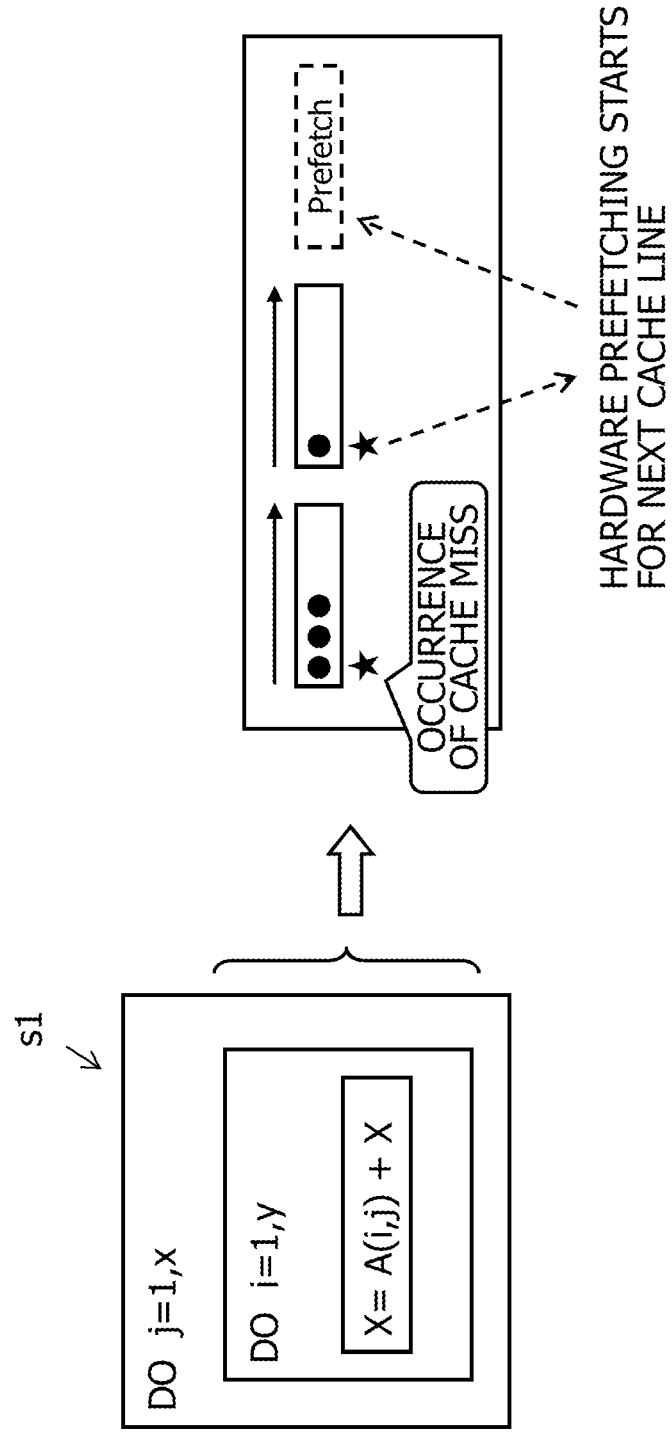
FIG. 1 is a diagram illustrating an example of how hardware prefetching starts.
Figure 2:
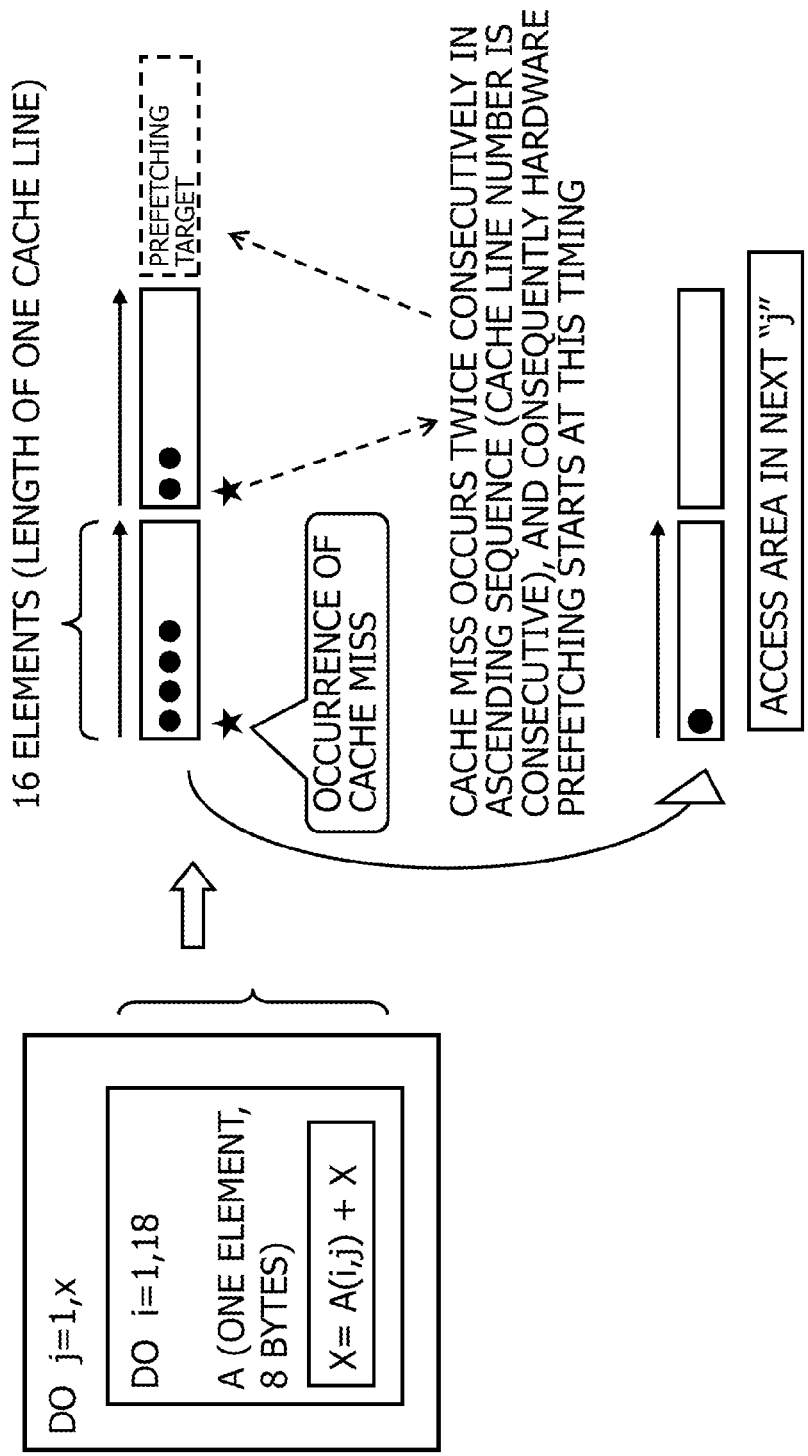
FIG. 2 is a diagram illustrating a specific example of how the hardware prefetching starts.
Figure 3:
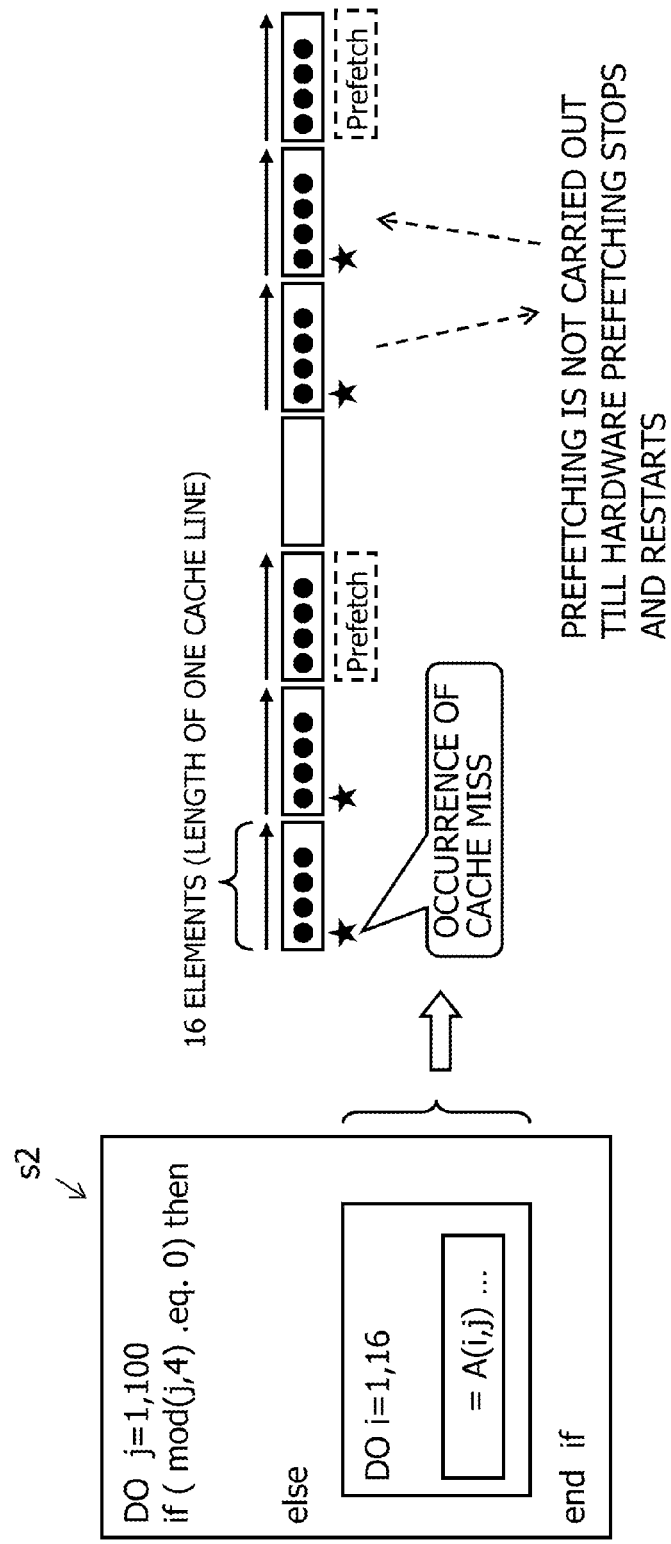
FIG. 3 is a diagram illustrating a specific example of how the hardware prefetching stops.

FIGS. 1 through 3 are explanatory diagrams of a hardware prefetching mechanism. FIG. 1 is the diagram illustrating an example of how hardware prefetching starts. A loop process specified by "j" beginning with "DO" is written in a program source code (which will hereinafter simply be termed a source code) indicated by "s1" in FIG. 1. The j-loop process further includes an i-loop process. The i-loop process includes a process of referring to an array A(i, j). Consecutive areas on a main storage device are accessed by referring to the array A(i, j).

FIG. 1 further illustrates an image of having an access to a cache memory (which will hereinafter simply be also termed a memory) associated with the source code "s1". A start of the hardware prefetching is automatically triggered by accessing the consecutive areas after a fixed period of time. For example, when cache misses marked with stars in FIG. 1 are detected on consecutive cache lines, it is predicted to likewise have an access to the consecutive area next time, resulting in prefetching next cache line data.

FIG. 2 is a diagram illustrating a specific example of how the hardware prefetching starts. The source code like the code in FIG. 1 is written in FIG. 2. However, a control variable "i" in the internal loop process takes values of 1 through 18. It is assumed that one element of the array A(i, j) is set to 8 bytes. One cache line has a length of 128 bytes. In this case, one cache line includes 16 elements.

When accessing the consecutive area on an 8-byte basis by referring to the array A(i, j), a first cache miss occurs in the access with the control variable "i" being "1". The cache memory manages replacement of memory contents on a cache line basis, and hence data to be accessed exists on the same cache line with respect to the access with the control variable "i" being "2" through "16", resulting in occurrence of a cache hit. The data to be accessed is allocated to a next cache line with respect to the access with the control variable "i" being "17", resulting in occurrence of a second cache miss.

A determination of whether the cache miss occurs in accessing the consecutive area is made based on, e.g., a cache line number. Upon occurrence of a plurality of cache misses on the consecutive line number, the hardware prefetching is started. A discussion on the present embodiment will be made on the assumption that the start of the hardware prefetching is triggered by the occurrence of the two cache misses.

Upon the occurrence of the second cache miss in FIG. 2, the hardware prefetching starts. Along with the start of the hardware prefetching, a prefetching target cache line encompassed by a dotted line is prefetched. The internal loop process, however, terminates with the control variable "i" being up to "18", and processing advances to a next loop of "j". The prefetched data is not therefore referred to.

FIG. 3 is a diagram illustrating a specific example of how the hardware prefetching stops. The j-loop process is written in a source code indicated by "s2" in FIG. 3. When "j" is not a multiple of "4", the i-loop process is executed. The i-loop process includes the process of referring to the array A(i, j). The control variable "i" takes values of 1 through 16. It is assumed that one element of the array A(i, j) is set to 8 bytes, and one cache line has the length of 128 bytes.

When a value of "j" is "1" but is not a multiple of "4", the i-loop process is consequently executed. The cache miss occurs in the access with "i" being "1". The access with "i" being "2" through "16" leads to a cache hit because of access data existing on the same cache line.

The i-loop process is executed also when "j" is "2". The second cache miss occurs in the access with "i" being "1". The start of the hardware prefetching is triggered by the occurrence of the second cache miss, and the data on the next cache line is prefetched. The i-loop process is executed also when "j" is "3". The access data is prefetched to the cache memory, resulting in no occurrence of the cache miss.

A j's value is "4" and is therefore a multiple of "4", and consequently the i-loop process is not executed. The accessing to the consecutive area is thereby finished, and the cache line number of the cache line including the access data is neither in an ascending sequence (nor in a descending order). The hardware prefetching stops at this point of time. The hardware prefetching does not start till the cache miss occurs consecutively when "j" is "5" and "6".

Note that the discussion will be made on the assumption that the element of the array is set to 8 bytes, and one cache line has the length of 128 bytes in the drawings throughout, and there is, however, no limit to sizes thereof. The discussion has been also made on the assumption that the hardware prefetching starts when the cache miss occurs twice consecutively on the plurality of cache lines having the consecutive cache line numbers, and nevertheless it does not mean that a cache miss occurrence count is limited to "2". The cache miss occurrence count may take an arbitrary threshold value n as a condition for starting the hardware prefetching.

The proper threshold value n under the condition for starting the hardware prefetching for the consecutive area, depends on an average size of the consecutive area to be accessed within the program. When the threshold value n is smaller than a proper value, unnecessary prefetching is carried out even after finishing the access to the consecutive area, and a memory band width is compressed as the case may be. Whereas when the threshold value n is larger than the proper value, there occurs an extended period of warmup time till starting the hardware prefetching, a read delay due to the cache miss does not become concealed.

The hardware prefetching is implemented by setting a fixed threshold value n, in which case the access to the consecutive area is finished before an elapse of the warmup time depending on the size of the consecutive area to be accessed within the program, resulting in no acquisition of any effect of the hardware prefetching as the case may be. For example, in FIG. 2, the size ((18×8) bytes) of the consecutive area to be accessed for referring to the array A(i, j) is smaller than a size given by cache line length×2 ((128×2) bytes). Though a third cache line is consequently prefetched, the processing advances to a loop process with a next j's value to access another area, and hence the prefetched data is not accessed, resulting in futility of the hardware prefetching.

Thus, the memory band width is wasted by issuing an unnecessary hardware prefetching instruction, and the hardware prefetching stops with no occurrence of the access to the consecutive area, whereby the effect of the hardware prefetching is not acquired as the case may be.

Note that the source code is written in FORTRAN language by way of an example in the drawings throughout in the embodiment, and may also be written in other programming languages without any dependence of a description of each drawing on the language. The access to the consecutive area as the condition for the start of the hardware prefetching may be an access to the areas being consecutive in the ascending sequence of addresses and may also be an access to the areas being consecutive in the descending sequence of addresses.

<Occurrence of Cache Miss>

Figure 4:
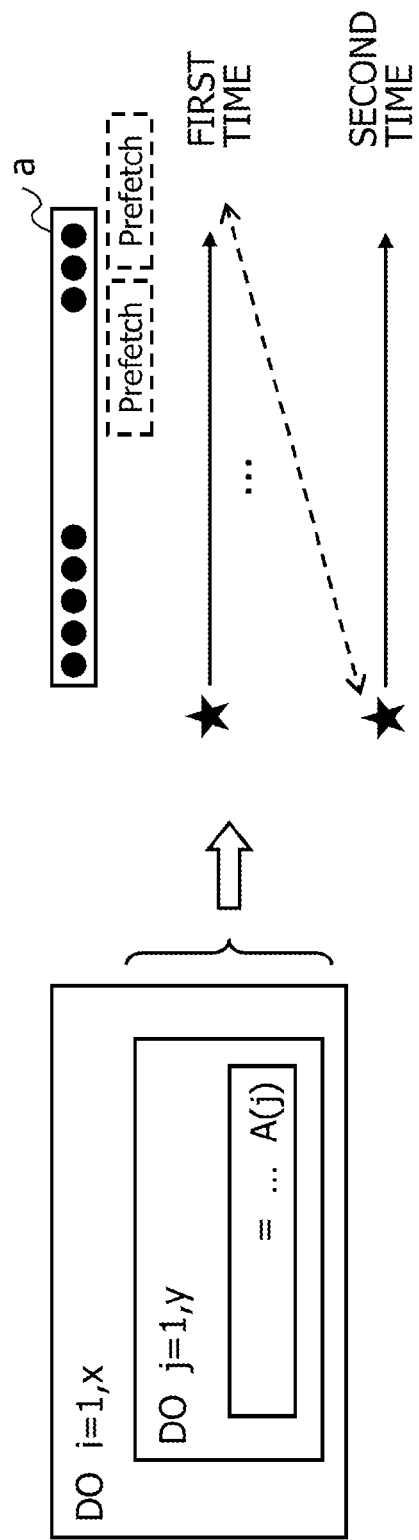
FIG. 4 is a diagram illustrating an example of the occurrence of the cache miss due to the stop of the hardware prefetching.
Figure 5:
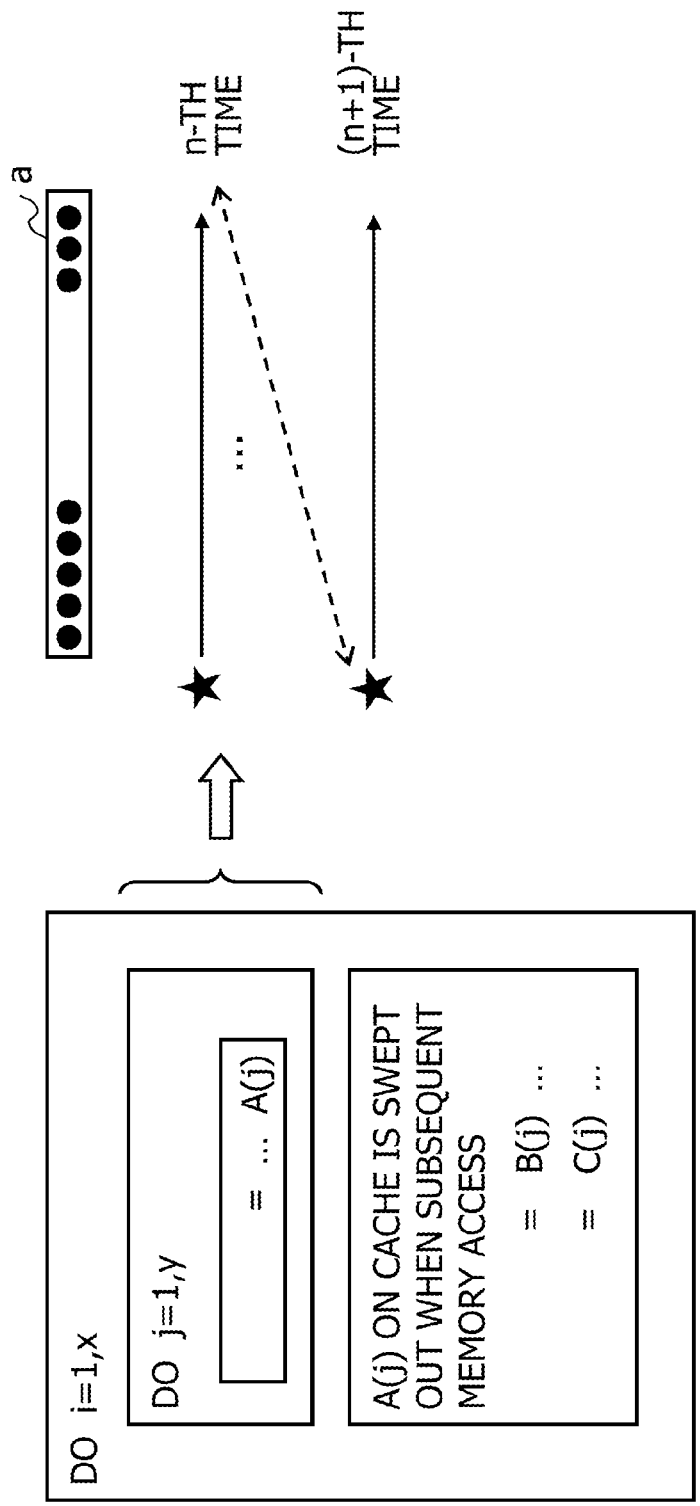
FIG. 5 is a diagram illustrating an example of the occurrence of the cache miss due to a conflict on a cache line.
Figure 6:
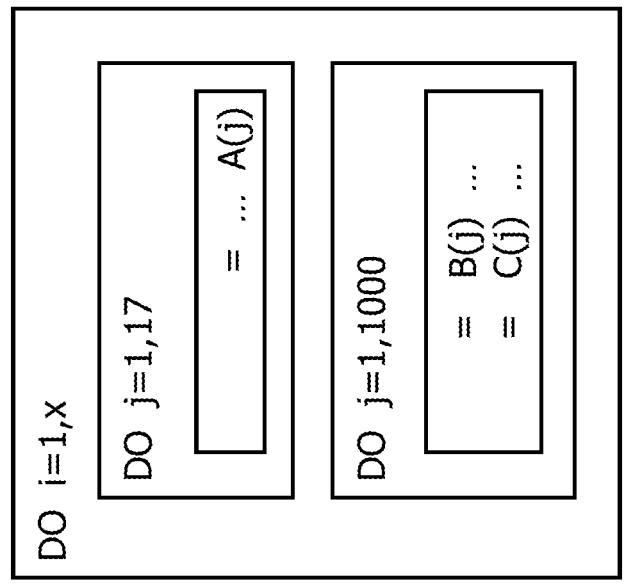
FIG. 6 is a diagram illustrating a specific example of FIG. 5.

FIGS. 4 through 6 are explanatory diagrams illustrating examples of how the cache miss occurs. FIG. 4 is the diagram illustrating the example of the occurrence of the cache miss due to a stop of the hardware prefetching. A source code depicted in FIG. 4 contains a description of the i-loop process. The i-loop process further includes the j-loop process. The j-loop process includes a process of referring to an array A(j).

In the array A(j), the same area containing data of the array A(j) is repeatedly accessed for every i-loop. In FIG. 4, "a" represents an area containing the data of the array A(j). When the control variable "i" is "1", the start of the hardware prefetching is triggered by the occurrence of the plurality of cache misses due to the first access to the data of the array A(j). The data of the array A(j) are prefetched to the end.

Upon switchover of "i" to "2" subsequent to an end of the process with "i" being "1", the access to the data of the array A(j) loops back to a head position, and the hardware prefetching stops because of the access areas not being consecutive. The data of the array A(j) being arranged in the cache memory at the first access are swept out of the cache memory as the case may be due to an access to the data having another variable. Consequently, when the data of the array A(j) are swept out of the cache memory at the second access to the data of the array A(j), the cache miss occurs.

To be specific, when the hardware prefetching stops at the access to the data of the array A(j) from the second time onward and the data of the array A(j) are swept out of the cache memory due to the access to the data having another variable, the cache miss occurs.

FIG. 5 is the diagram illustrating an example of the occurrence of the cache miss due to a conflict on the cache line. FIG. 5 illustrates a description of the source code like the code in FIG. 4. However, the i-loop process includes a process of referring to arrays B(j) and C(j) after the j-loop process. In FIG. 5, "a" represents the consecutive area to be accessed from the array A(j).

It is herein assumed that the three arrays A, B and C are allocated to the same cache line with a number of Ways in the cache memory being "2". The start of the hardware prefetching is triggered by the occurrence of the plurality of cache misses due to an n-th access to the data of the array A(j) when the control variable "i" is "1". The data of the array A(j) are prefetched to the end.

Thereafter, when the data of the array B(j) and the array C(j) are accessed, the data of the array A(j) arranged on the same cache line are swept out of the cache line. Therefore, after "i" has been switched over to "n+1", the cache miss occurs in an (n+1)-th access to the data of the array A(j). These operations are alternately repeated, and hence the cache miss occurs whenever accessing the head of the array A(j).

FIG. 6 is the diagram illustrating a specific example of FIG. 5. A source code depicted in FIG. 6 contains a description of the i-loop process. The i-loop process further includes two j-loop processes. The first j-loop process includes the process of referring to the array A(j), the variable "j" taking values of "1" through "17". The second j-loop process includes a process of referring to the arrays B(j) and C(j), the variable "j" taking values of "1" through "1000".

Note that the arrays A(j), B(j) and C(j) are arrays of a double-precision real type with a number of elements being given by 16*1024/8. When a size of the data cache Way of the processor is set to 16 kB, each of the arrays A, B and C is coincident with the Way size, and therefore the same cache line number is allocated to a head address of each area.

With the reference to the arrays B(j) and C(j) in the second j-loop process, the data of the arrays B(j) and C(j) conflict with the data of the array A(j) being already arranged on the cache line. The data of the array A(j) are swept out of the cache line at this time, and consequently the cache miss occurs whenever accessing the head of the array A(j) in the first j-loop process.

Upon the occurrence of the cache miss due to the access to the head of the array A(j), the data on the first cache line containing the data with "j" being "1" through "16" are arranged in the cache memory. Further, when "j" is "17", the second cache miss occurs due to the access to the data on the second cache line. This event causes the start of the hardware prefetching, and the data from the third cache line onward are prefetched. However, the looping with respect to "j" terminates at the seventeenth process, and hence the data from the third cache line onward are not utilized.

Thus, the access to the consecutive area is finished in a period till starting the hardware prefetching, and the occurrence of the cache misses is not reduced depending on a loop rolling count. Moreover, the data acquired by the hardware prefetching are not used in the program, resulting in the futility of the hardware prefetching itself. In other words, it follows in the example of FIG. 6 that the futile hardware prefetching is performed in addition to occurrence of cache thrashing due to the conflict on the cache line.

<Cache Blocking>

Figure 7:
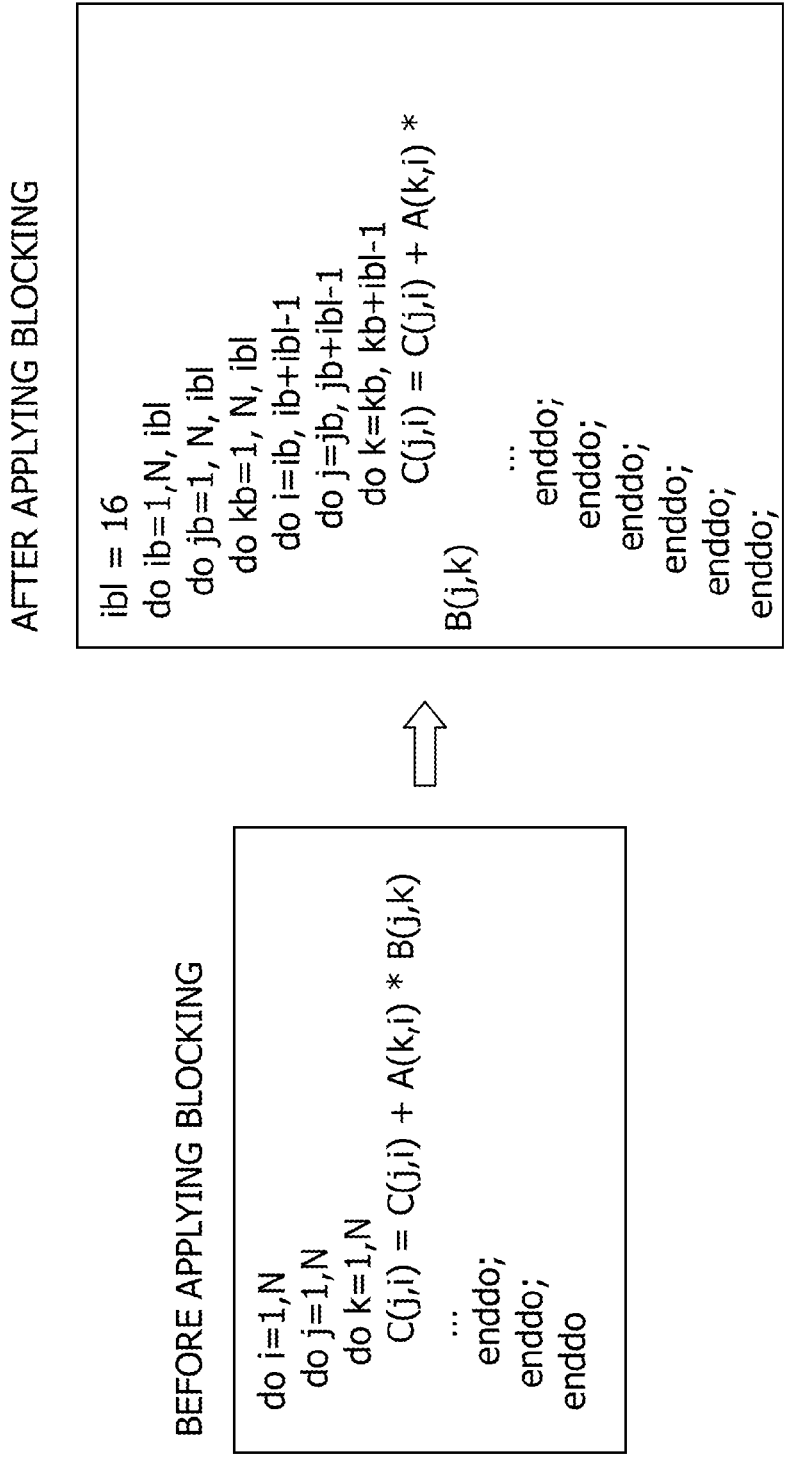
FIG. 7 is a diagram illustrating examples of source codes before and after applying cache blocking.
Figure 8:
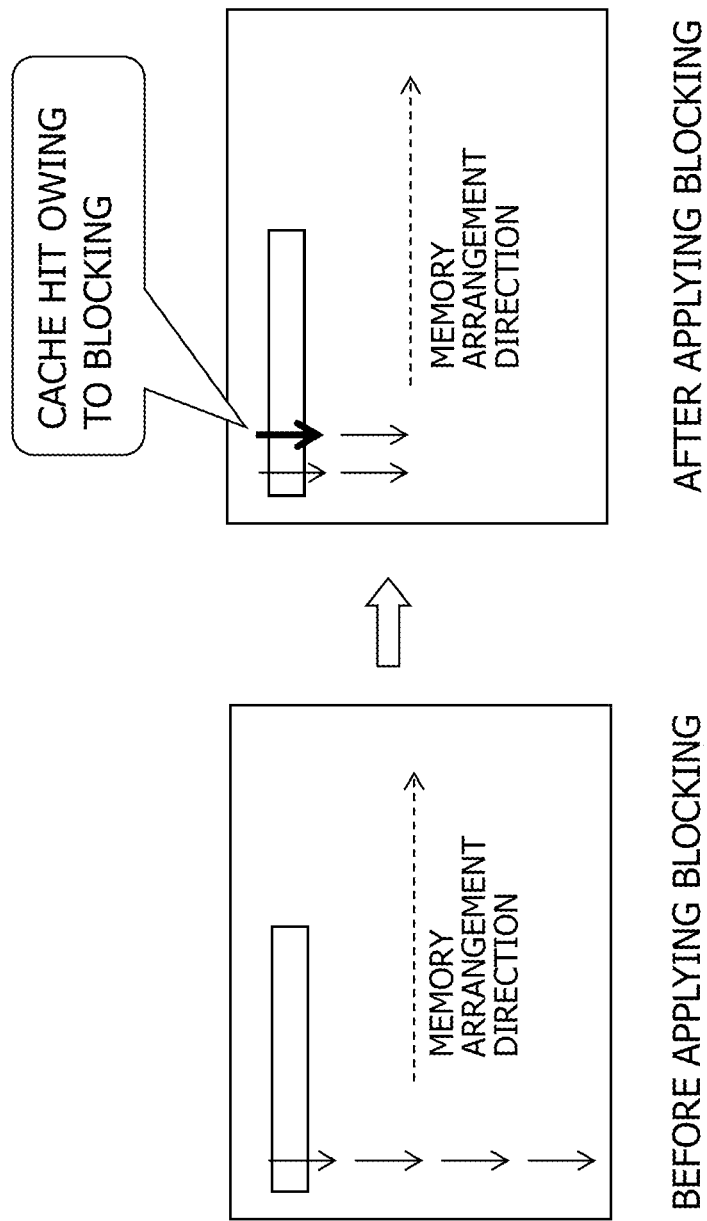
FIG. 8 is a diagram illustrating an example of an image of a memory access based on an array B in FIG. 7.

FIGS. 7 and 8 are explanatory diagrams of cache blocking. FIG. 7 is the diagram illustrating examples of source codes before and after applying a cache blocking technique. The cache blocking, which is a general software-based technique for optimization, operates to change an accessing method for areas to be accessed at a predetermined interval so as to attain "partially an access to the consecutive area". With a change of the accessing method, the accessed data are kept remaining in the cache memory, thereby reducing the cache misses. The cache blocking will hereinafter be simply termed "blocking".

To be specific, the data are structured into blocks so that the areas to be accessed are arranged within the cache memory, and the access is made on a block-by-block basis, thereby reducing the occurrence of the cache misses. The accessing method is changed by changing a loop nest structure to have the access on the block-by-block basis. The data blocks arranged on the cache memory are used or reused, thereby reducing loads on the memory access and on a memory bandwidth.

In the example of the source code before applying the blocking in FIG. 7, a control variable of an innermost loop process is a variable "k" of the second dimension of the array B(j,k), and therefore the access to the array B(j,k) does not become the access to the consecutive area but becomes an access overpassing the cache line.

In the example of the source code after applying the blocking in FIG. 7, the loop process of each control variable is subdivided. The accesses are thereby organized on the block-by-block basis, and the data acquired on the same cache line in the data of the array B(j,k) are kept remaining in the cache memory.

FIG. 8 is a diagram illustrating an example of an image of the memory access based on the array B in FIG. 7. The image of the memory access in FIG. 8 is that the memories are arranged in a crosswise direction. Before applying the blocking, the access to the array B becomes an access in a lengthwise direction overpassing the cache line. After applying the blocking, the access to the array B becomes an access to the area being subdivided into blocks. When the number of Ways is "2", two sets of data allocated to the same cache line are kept remaining in the cache memory, and hence the cache hit occurs when accessing the array B after applying the blocking.

The data of the array B on the cache memory are swept out of the cache due to the access to another variable and other equivalent accesses as the case may be. In this case, the occurrence of the cache misses is not reduced, resulting in deteriorated performance due to an increase in branch processes caused by an addition of loops.

Further, a block length is larger than the cache size, in which case the data having undergone the blocking overflow from the cache, and the occurrence of the cache misses is not therefore reduced. Still further, when the program migrates to a system having a different cache size, the occurrence of the cache misses is not reduced unless the block length is modified to be equal to or smaller than the cache size. When the occurrence of the cache misses is not reduced, the performance is not improved.

First Embodiment

A compiler according to a first embodiment specifies an array satisfying a predetermined condition in the loop processes on a plurality of nest levels, and multi-dimensionalizes the specified array. With the array being multi-dimensionalized, the operation is not that the access to the head of the array is iterated whenever repeating external loop processes but that the areas having the consecutive addresses are accessed in the external loop processes throughout. With this operation, the hardware prefetching continues, and the occurrence of the cache misses is reduced.

With the multi-dimensionalization of the array, the areas having the consecutive addresses are accessed in the external loop processes throughout, and hence the data of the array are allocated to another cache line, thereby avoiding the cache line conflict with another variable. Thus, the occurrence of the cache misses is reduced.

Figure 9:
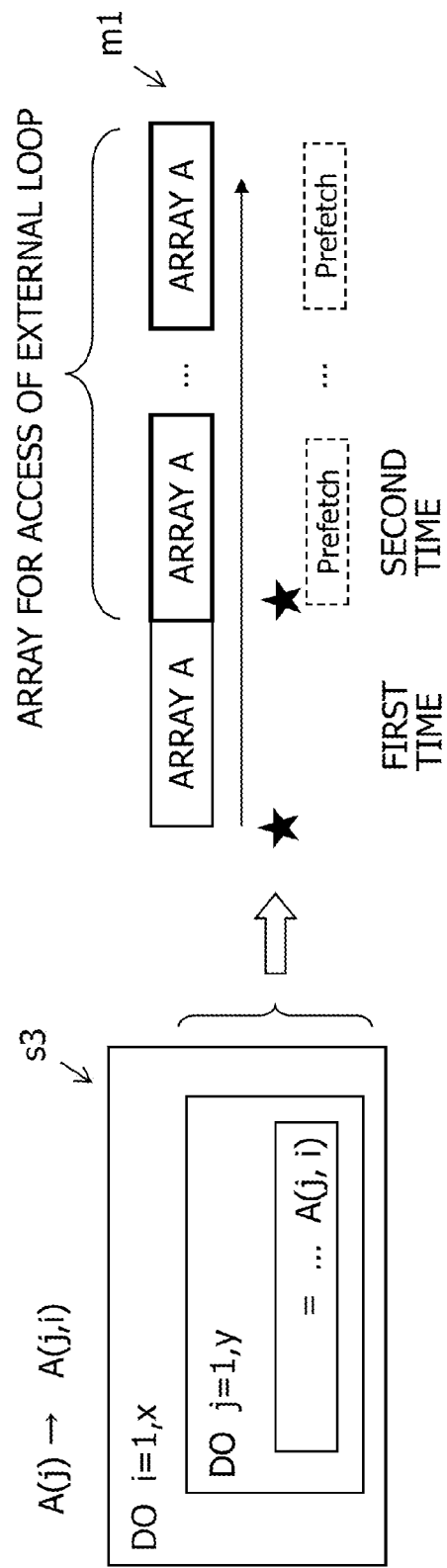
FIG. 9 is a diagram illustrating an example of how the hardware prefetching continues due to multi-dimensionalization of the array.

FIGS. 9 through 11B are explanatory diagrams of how the multi-dimensionalization of the array reduces the occurrence of the cache misses. FIG. 9 illustrates how the hardware prefetching continues. FIGS. 10A through 11B illustrate how the conflict on the cache line is avoided.

FIG. 9 is the diagram illustrating an example of how the hardware prefetching continues owing to the multi-dimensionalization of the array. A source code indicated by "s3" in FIG. 9 contains a description of the i-loop process. The i-loop process includes the j-loop process. The j-loop process includes a process of referring to an array A(j,i). The array A(j,i) is an array into which the array A(j) is redefined as the multi-dimensional array by using the control variable "i" of the external loop process as an element of the additional dimension.

The source code in FIG. 9 is described in FORTRAN language; and, however, the one-dimensional array A[j] is redefined as the two-dimensional array A[j,i] when described in C language. Given herein is an example of multi-dimensionalizing the one-dimensional array into the two-dimensional array, and a multi-dimensionalization target array may be two- or more-dimensional array without being limited to the number of dimensions.

In a memory access image indicated by "m1" of FIG. 9, the array is multi-dimensionalized by the control variable "i" being "2" through "x", and the data of the array A to be accessed in the external loop process are thereby prepared for the consecutive areas.

The cache miss marked with the star occurs in the first access to the data of the array A. The second cache miss about the consecutive area occurs in the second access to the data of the array A, thereby starting the hardware prefetching. The accessing becomes the access to the consecutive area during the external loop process, and therefore the hardware prefetching continues also from the second access to the data of the array A onward.

Because of the continuation of the hardware prefetching, the data of the array A are arranged again in the cache memory through prefetching even when swept out of the cache memory due to the access to another variable. The data of the array A are kept remaining in the cache memory, thereby reducing the occurrence of the cache misses.

Figure 10A:
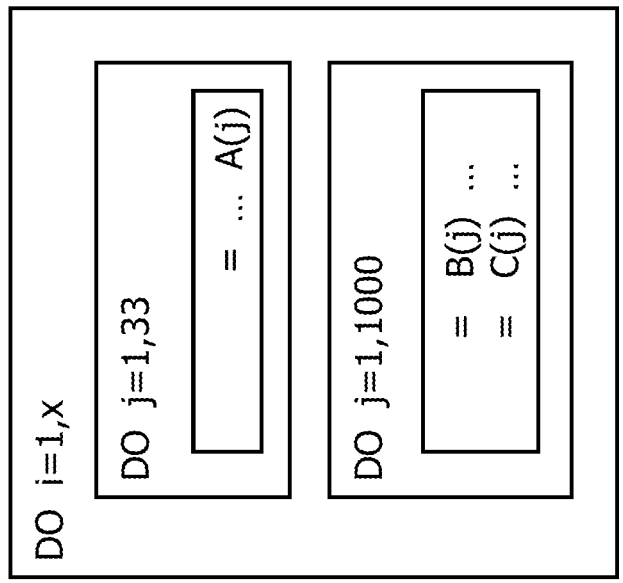
FIG. 10A is a diagram illustrating an example of such a source code that the conflict occurs on the cache line.

FIGS. 10A through 11B are explanatory diagrams of the conflict on the cache line. FIG. 10A depicts an example of such a source code that the conflict occurs on the cache line. The source code in FIG. 10A is substantially the same as the source code in FIG. 6, and the explanations of the common elements are therefore omitted. The j-loop process in the internal loop process includes the process of referring to the array A(j), in which the variable "j" takes values "1" through "33".

FIG. 10B is the diagram illustrating an example of the memory access image when the conflict occurs on the cache line. When the control variable "i" is "n" in the external loop process, the cache miss indicated by an arrow occurs twice due to the access to the data of the array A.

In an illustration indicated by "f1" in FIG. 10B, the axis of abscissa represents an arrangement address, while the axis of ordinates represents a cache line number L. The data of the array A acquired from the main storage device due to the cache miss are arranged on the second cache line counted from under. Next, the array B spaced at a predetermined interval in terms of the arrangement address from the array A is referred to. The data of the array B are arranged on the second cache line counter from under as in the case of the array A. Subsequently, the array C spaced at a predetermined interval in terms of the arrangement address from the array B is referred to. The data of the array C are likewise arranged on the second cache line counted from under as in the case of the array A; and, however, the conflict occurs on the cache line because of 2 Ways being used for the arrays A, B when the number of Ways is "2". The data of the array A are swept out of the cache memory due to the cache thrashing.

The process with "1" being "n+1" is executed in the external loop process. The data of the array A have already been swept out of the cache memory when accessing the data of the array A, and consequently the cache miss indicated by the arrow occurs twice. Thereafter, the processing advances in the same way as when the control variable "i" is "n", resulting in the occurrence of the conflict on the cache line. The data of the array A are swept out of the cache memory due to the cache thrashing. Similarly, the conflict occurs on the cache line also in the processes with "i" being "n+2" or larger, and the cache miss occurs whenever accessing the data of the array A.

Figure 11A:
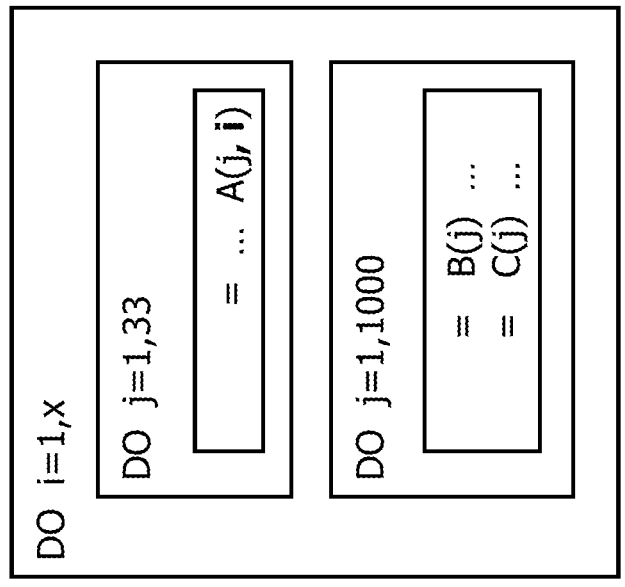
FIG. 11A is a diagram illustrating an example of such a source code as to avoid the conflict on the cache line by the multi-dimensionalization of the array.

FIG. 11A is the diagram illustrating an example of such a source code as to avoid the conflict on the cache line by the multi-dimensionalization of the array. The source code in FIG. 11A is substantially the same as the source code in FIG. 10A, and the explanations of the common elements are therefore omitted. The first j-loop process in the internal loop process includes the process of referring to the array A (j,i). The array A (j,i) is an array into which the array A(j) is multi-dimensionalized by the control variable "i" of the external loop process.

FIG. 11B is the diagram illustrating an example of the memory access image when having avoided the conflict on the cache line. When the control variable "i" is "1" in the external loop process, the cache miss indicated by the arrow occurs twice due to the first access to the data of the array A.

In an illustration indicated by "f2" in FIG. 11B, the axis of abscissa represents the arrangement address, while the axis of ordinates represents the cache line number L. The data of the array A acquired from the main storage device due to the cache miss are arranged on the second cache line counted from under. Next, the array B spaced at the predetermined interval in terms of the arrangement address from the array A is referred to. The data of the array B are arranged on the second cache line counter from under as in the case of the array A. Subsequently, the array C spaced at the predetermined interval in terms of the arrangement address from the array B is referred to. The data of the array C are arranged on the second cache line counted from under.

Note that the area containing the data of the array A(j,i) becomes the consecutive area also with respect to the control variable "i" of the external loop process. To be specific, the area containing the data of the array A(j,i) becomes the consecutive area also with respect to the control variable "i" of the external loop process by the multi-dimensionalization of the array A. In other words, the data of the array A(j,i) are arranged also on the cache line having a different cache line. The operation is therefore not that the same cache line is accessed each time the j-loop process is iterated but that the second access and subsequent accesses to the cache lines having the different cache line numbers are made.

For example, when the control variable "i" is "2" in the external loop process, the second access to the data of the array A(j,i) becomes an access to the third cache line counted from under, resulting in no occurrence of the conflict on the cache line of the array B and the array C. The accessing does not become the access to the same cache line as those of the arrays B, C also when the control variable "i" is "3" or larger, resulting in no occurrence of the conflict on the cache line of the array B and the array C.

In other words, the accesses are not concentrated on a specified cache line owing to the multi-dimensionalization of the array, thereby enabling the reduction of the conflict on the cache line with the access to the data of another variable. The reduction of the conflict on the cache line leads to a decrease in occurrence of the cache misses.

<Configuration of Apparatus>

Figure 12:
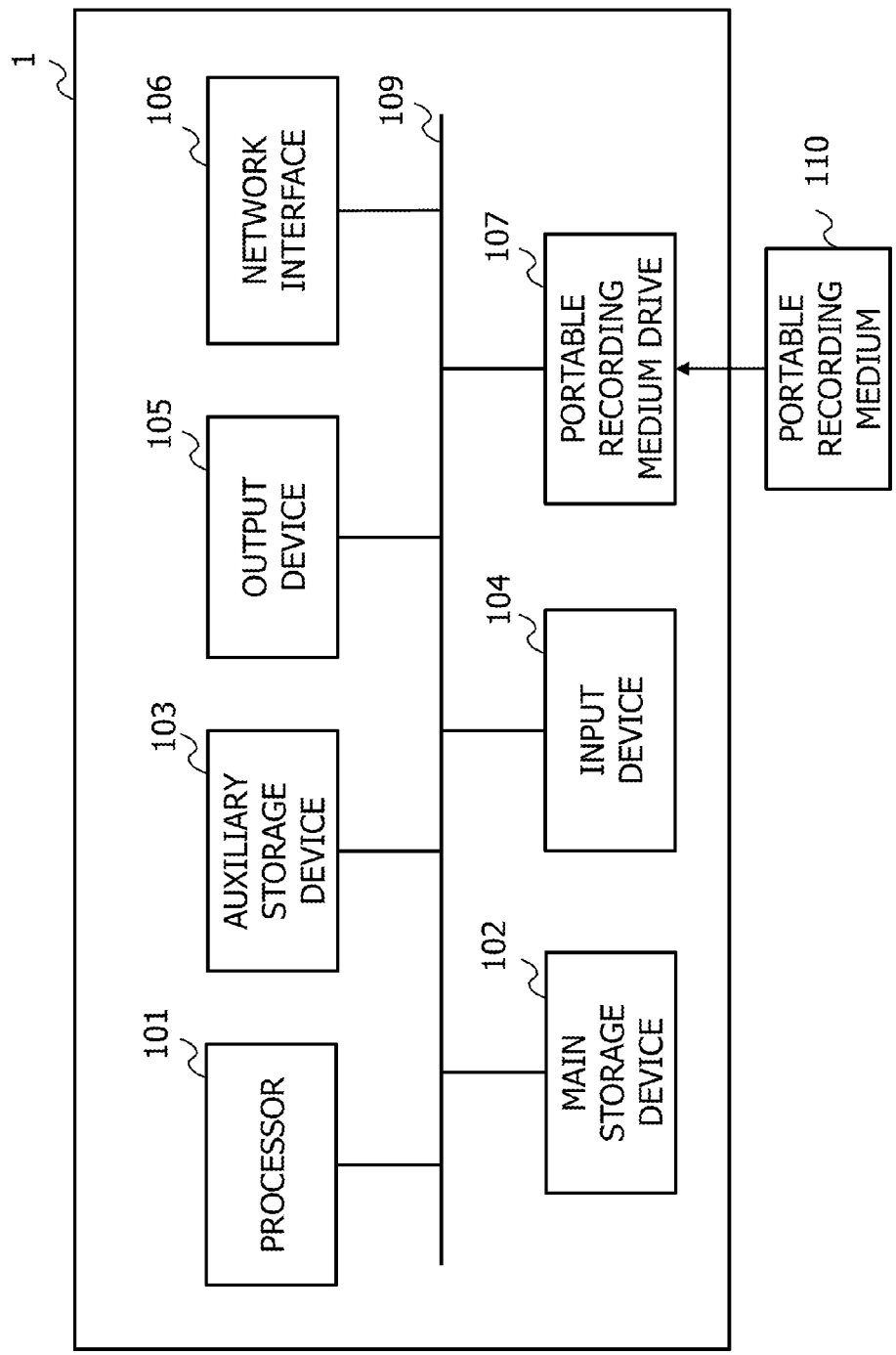
FIG. 12 is a diagram illustrating one example of a configuration of an information processing apparatus.

FIG. 12 is a diagram illustrating one example of a configuration of an information processing apparatus 1. The information processing apparatus 1 includes a processor 101, a main storage device 102, an auxiliary storage device 103, an input device 104, an output device 105, a network interface 106, and a portable recording medium drive 107. These components are interconnected via a bus 109. A portable recording medium 110 is connected to the portable recording medium drive 107.

The processor 101 is exemplified by a Central Processing Unit (CPU). The processor 101 loads an Operating System (OS) and a variety of application programs, which are retained on the auxiliary storage device 103 or the portable recording medium 110 into the main storage device 102, and executes these software components, thereby executing multiple processes. The information processing apparatus 1 may be equipped with a plurality of processors 101 without being limited to one processor.

The main storage device 102 provides the processor 101 with a storage area for loading the programs stored on the auxiliary storage device 103 and with an operating area for executing the programs. The main storage device 102 is also used as a buffer for retaining the data. The main storage device 102 is a semiconductor memory instanced by a Read Only Memory (ROM), a Random Access Memory (RAM) and other equivalent memories. The main storage device 102 is one example of a memory.

The auxiliary storage device 103 stores the various categories of programs and the data used for the processor 101 to execute the respective programs. The auxiliary storage device 103 is a nonvolatile memory instanced by an Erasable Programmable ROM (EPROM) or a hard disk drive (HDD) and other equivalent memories. The auxiliary storage device 103 retains, e.g., the OS, a compiler program and other various application programs.

The input device 104 is exemplified by a keyboard and a pointing device instanced by a mouse, and other equivalent devices. The data inputted from the input device 104 are output to the processor 101. The output device 105 outputs a processing result of the processor 101. The output device 105 is a voice/sound output device instanced by a display, a printer, a speaker, and other equivalent devices.

The network interface 106 is an interface for inputting and outputting information to and from a network. The network interface 106 includes an interface that connects to a cable network, and an interface that connects to a wireless network. The network interface 106 is exemplified by a Network Interface Card (NIC), a wireless Local Area Network (LAN) card, and other equivalent interfaces. The data and other equivalent information received by the network interface 106 are output to the processor 101.

The portable recording medium drive 107 reads the programs and various items of data recorded on a portable recording medium 110, and outputs the readout programs and data to the processor 101. The portable recording medium 110 is exemplified by an SD card, a mini SD card, a micro SD card, a Universal Serial Bus (USB) flash memory, a Compact Disc (CD), a Digital Versatile Disc (DVD), a flash memory card, and other equivalent mediums.

In the information processing apparatus 1, the processor 101 loads the compiler program retained on the auxiliary storage device 103 into the main storage device 102, and executes the compiler program. Note that the configuration of the information processing apparatus 1 is given as one example, and the components thereof may be properly omitted, replaced and added corresponding to the embodiment without being limited to those described above. The compiler program may also be recorded on the portable recording medium 110.

<Processing Configuration>

Figure 13:
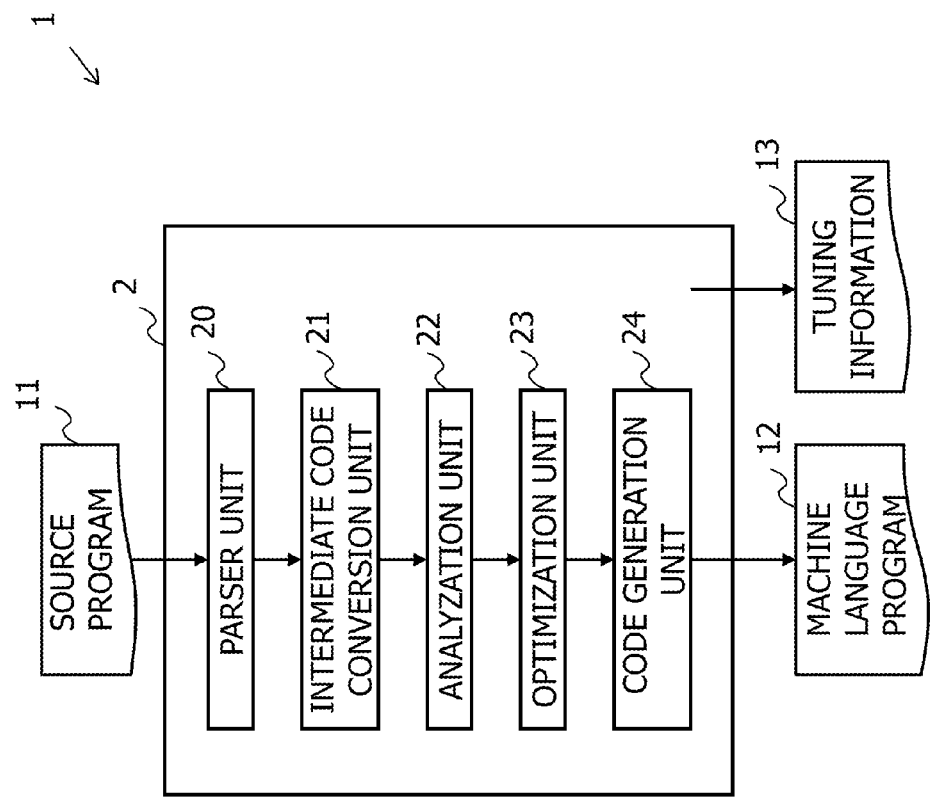
FIG. 13 is a diagram illustrating one example of the processing configuration of the information processing apparatus.

FIGS. 13 through 15C are explanatory diagrams of a processing configuration of the information processing apparatus 1. FIG. 13 is the diagram illustrating one example of the processing configuration of the information processing apparatus 1. The information processing apparatus 1 includes a compiler 2, a source program 11, a machine language program 12, and tuning information 13.

The compiler 2 translates the source program 11 described in a high-level language instanced by FORTRAN and other equivalent languages, and outputs the machine language program 12 and the tuning information 13. The machine language program 12 is structured as a series of instructions that can be executed directly by the processor 101. The machine language program 12 will hereinafter be referred to also as an object or object code. The tuning information 13 is information on translated results of the compiler 2.

The compiler 2 includes a parser unit 20, an intermediate code conversion unit 21, an analyzation unit 22, an optimization unit 23, and a code generation unit 24. The processor 101 executes, as the parser unit 20, the intermediate code conversion unit 21, the analyzation unit 22, the optimization unit 23 and the code generation unit 24, the computer program deployed in an executable manner on the main storage device 102. However, any one of the parser unit 20, the intermediate code conversion unit 21, the analyzation unit 22, the optimization unit 23 and the code generation unit 24 or a part of processes thereof may be implemented by a hardware circuit.

The parser unit 20 parses the source program 11. The intermediate code conversion unit 21 converts the source program 11 into an intermediate code, based on an parsed result of the parser unit 20. The analyzation unit 22 specifies the array satisfying the predetermined condition by analyzing the intermediate code. The optimization unit 23 optimizes the intermediate code by multi-dimensionalizing the array specified by the analyzation unit 22. The code generation unit 24 converts the intermediate code optimized by the optimization unit 23 into the machine language program 12. The optimization unit 23 and the code generation unit 24 are one example of a generation unit.

Figure 14:
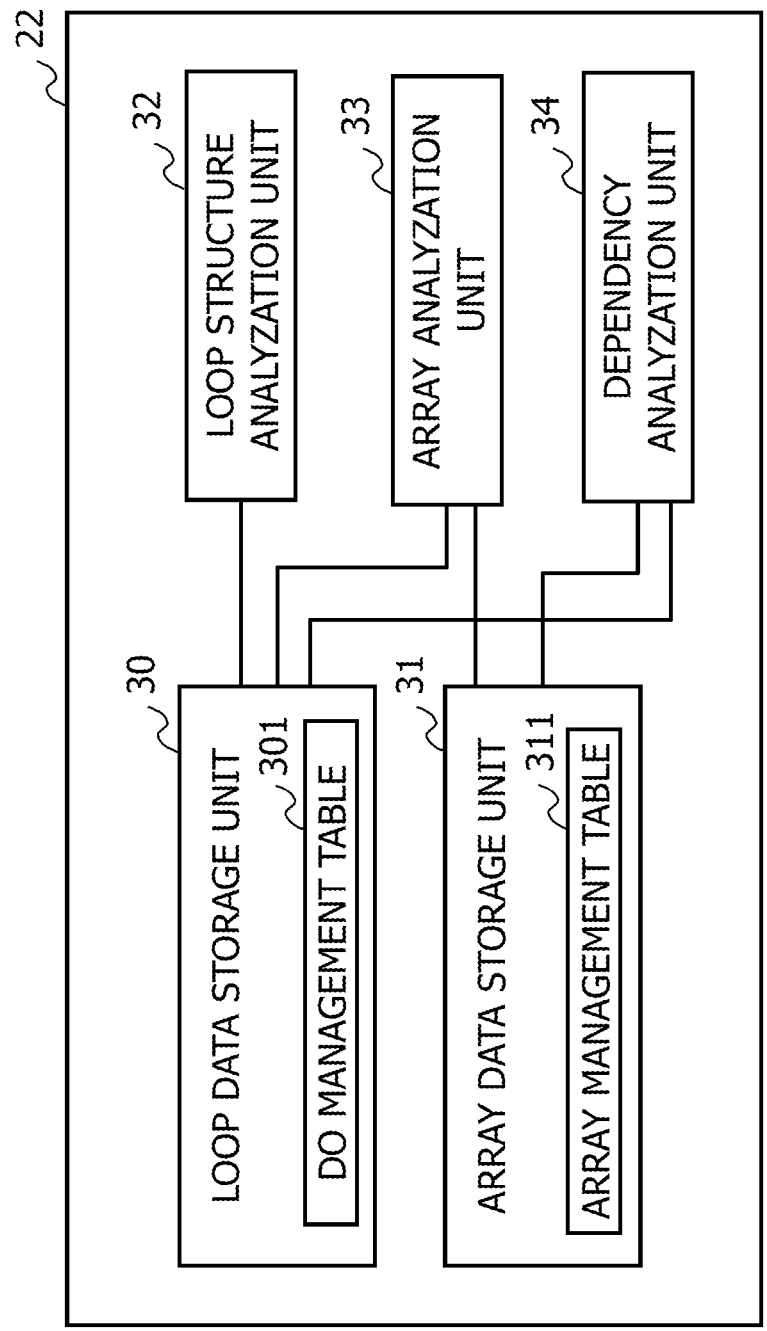
FIG. 14 is a diagram illustrating one example of a processing configuration of an analyzation unit of a compiler.

FIG. 14 is a diagram illustrating one example of the processing configuration of the analyzation unit 22 of the compiler 2. The analyzation unit 22 includes a loop data storage unit 30, an array data storage unit 31, a loop structure analyzation unit 32, an array analyzation unit 33, and a dependency analyzation unit 34. The processor 101 executes, as the loop data storage unit 30, the array data storage unit 31, the loop structure analyzation unit 32, the array analyzation unit 33 and the dependency analyzation unit 34, executes the computer program deployed in the executable manner on the main storage device 102. However, any one of the loop data storage unit 30, the array data storage unit 31, the loop structure analyzation unit 32, the array analyzation unit 33 and the dependency analyzation unit 34 or a part of processes thereof may also be implemented by the hardware circuit.

The loop data storage unit 30 has a DO management table 301. The DO management table 301 is generated by the loop structure analyzation unit 32, the array analyzation unit 33 and the dependency analyzation unit 34. The DO management table 301 stores loop-related information instanced by a row number, a nest level, a control variable, an initial value, a final value, an increment, a name of variable and other equivalent information.

The array data storage unit 31 has an array management table 311. The array management table 311 is generated by the array analyzation unit 33 and the dependency analyzation unit 34. The array management table 311 stores array-related information instanced by a name of array, a number of suffixes, a name of suffix per dimension, an intra-loop definition, a reference and other equivalent information.

The loop structure analyzation unit 32 analyzes a loop structure in the intermediate code, and stores an analyzed result on the DO management table 301. The array analyzation unit 33 analyzes an array structure in the intermediate code, and stores an analyzed result in the DO management table 301 and the array management table 311. The dependency analyzation unit 34 analyzes whether the array contains a dependency relation between the definition and the reference in the intermediate code, and stores an analyzed result in the DO management table 301 and the array management table 311.

The analyzation unit 22 can specify a multi-dimensionalization target array from the analyzed results of the loop structure analyzation unit 32, the array analyzation unit 33 and the dependency analyzation unit 34. The analyzation unit 22 defines an attribute to indicate whether the array is the multi-dimensionalization target array, and may store a purport that the specified array is a processing target array.

Figure 15A:
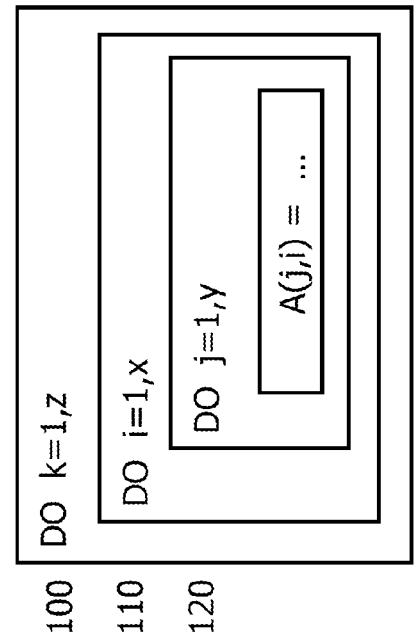
FIG. 15A is a diagram illustrating an example of a source code of an analyzation target loop process.

FIG. 15A is a diagram illustrating an example of a source code of an analyzation target loop process. In FIG. 15A, a k-loop process beginning with "DO" is written from a 100th line. The k-loop process includes the i-loop process. The i-loop process is written from a 110th line. The i-loop process includes the j-loop process. The j-loop process is written from a 120th line. The j-loop process includes a process of defining the array A(j,i).

Figure 15B:
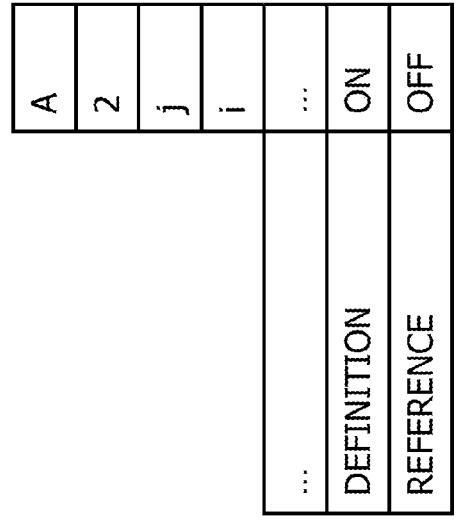
FIG. 15B is a diagram illustrating one example of a data structure of an array management table.

FIG. 15B is a diagram illustrating one example of a data structure of the array management table 311. The array management table 311 stores values of attributes instanced by the name of array, the number of suffixes, the name of suffix per dimension, the intra-loop definition, the reference and other equivalent attributes per array contained in the intermediate code.

In FIG. 15B, the array management table 311 depicts the values of the attributes associated with the array A(j,i) in FIG. 15A. The "name of array" field registers a name of variable of the array, and has a value "A". The "number of suffixes" field registers a number of array suffixes "j" and "i", and has a value "2". The "name of suffix per dimension" field registers a name of variable of the suffix of each dimension, the notation being such that the suffix name "j" represents "first dimension", and the suffix name "i" represents "second dimension". The intra-loop definition and the reference fields register results of whether the array is defined and whether the array is referred to. The array A(j,i) in FIG. 15A is defined (ON) but is not referred to (OFF). Therefore, the "definition" field registers "ON", while the "reference" field registers "OFF".

FIG. 15C is a diagram illustrating one example of a data structure of the DO management table 301. The DO management table 301 stores values of attributes instanced by the row number, the nest level, the control variable, the initial value, the final value, the increment, the name of variable and other equivalent information per loop process contained in the intermediate code.

In FIG. 15C, the DO management table 301 depicts values of attributes of the loop process at respective nest levels, i.e., 3-layer loop process with respect to "k", "i" and "j" in FIG. 15A. The "row number" field registers a row number in the source code, and has a value "100". The "nest level" field registers a layer of the loop process. The "control variable" field registers a variable for controlling the iteration of the loop process. The "initial value" field registers an initial value of values that can be taken by the control variable. The "final value" field registers a final value of the values that can be taken by the control variable. The "increment" field registers an increment of the control variable when the loop process loops back to the head. The "name of variable" field registers a name of variable of the array contained in the loop process. The "name of variable" field represents the name of variable of the array contained in the loop process. A "next nest management" field registers reference to a record of the loop process at the nest level one level under.

A table t1 in FIG. 15C represents a record of the k-loop process and indicates values of respective attributes of the k-loop process. A "row number" field registers a value "100". A "nest level" field registers "3". A "control variable" field registers "k". An "initial value" field registers "1". A "final value" field registers "z". An "increment" field registers "1". In the source code of FIG. 15A, the k-loop process does not include the array, and hence a "name of variable" field is a null field. A "next nest management" field registers an indication of records of the i-loop process.

A table t2 in FIG. 15C represents a record of the i-loop process and indicates values of respective attributes of the i-loop process. The "row number" field registers "110". The "nest level" field registers "2". The "control variable" field registers "i". The "initial value" field registers "1". The "final value" field registers "x". The "increment" field registers "1". In the source code of FIG. 15A, the i-loop process does not include the array, and therefore the "name of variable" field is the null field. The "next nest management" field registers an indication of records of the j-loop process.

A table t3 in FIG. 15C represents a record of the j-loop process and indicates values of respective attributes of the j-loop process. The "row number" field registers "120". The "nest level" field registers "1". The "control variable" field registers "j". The "initial value" field registers "1". The "final value" field registers "y". The "increment" field registers "1". The "name of variable" field registers "A".

<Multi-Dimensionalization of Array>

According to the first embodiment, the compiler 2 specifies the array that is multi-dimensionalized by analyzing the source code. FIGS. 16 through 21 are explanatory diagrams of the multi-dimensionalization of the array and the multi-dimensionalization target array.

Figure 16:
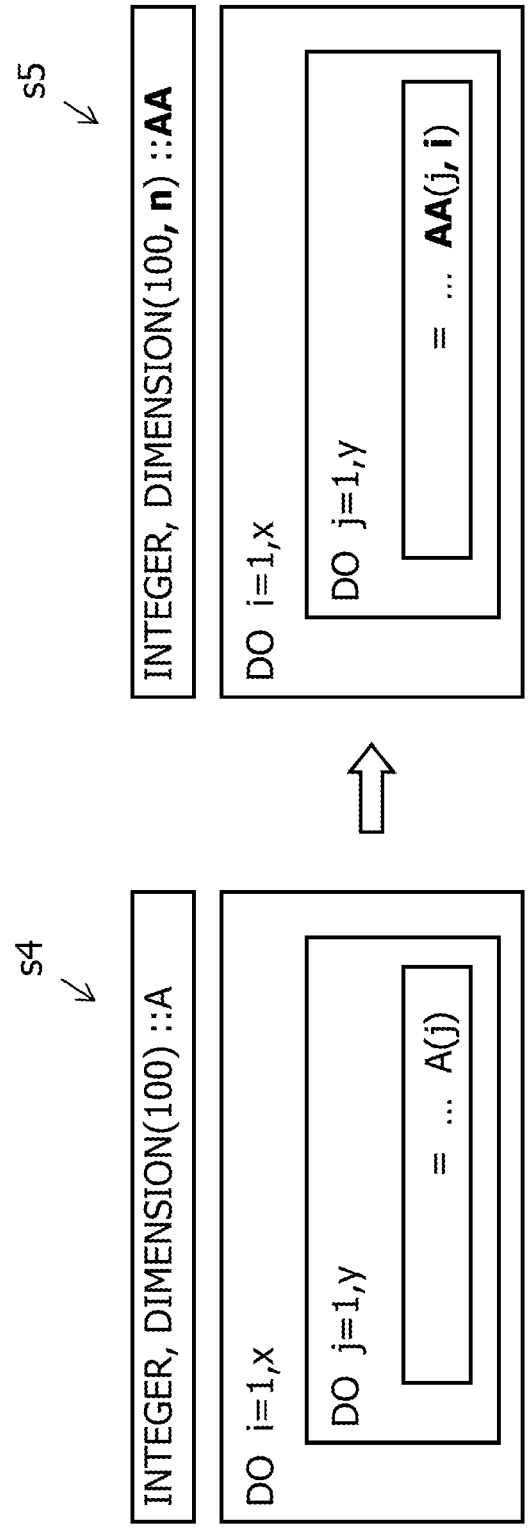
FIG. 16 is a diagram illustrating an example of a source code to multi-dimensionalize the array specified by the compiler.

FIG. 16 is the diagram illustrating an example of a source code to multi-dimensionalize the array specified by the compiler 2. The source code designated by "s4" in FIG. 16 is a program before multi-dimensionalizing the array. The i-loop process, the control variable "i" of which takes values of "1" through "x", is a loop process with a loop rolling count being "x". The i-loop process includes the j-loop process. The j-loop process, the variable "j" of which takes values of "1" through "y", is a loop process with the loop rolling count being "y". The j-loop process includes the process of referring to the array A(j). The array A(j) is an integer type one-dimensional array with an element count being "100".

A source code designated by "s5" in FIG. 16 is a program after multi-dimensionalizing the array. The compiler 2, upon specifying the array A(j) as the multi-dimensionalization target array, multi-dimensionalizes the array A(j) into an array AA(j,i). The array AA(j,i) is a (100×n) integer type two-dimensional array. Note that "n" takes a larger value of the loop rolling count "x" of the external i-loop process and the loop rolling count "y" of the internal j-loop process. The compiler 2 deems the program before being multi-dimensionalized as a program after being multi-dimensionalized, and thus translates the program.

The multi-dimensionalization target array is assumed to be an allocatable array with the element count being a constant when in translation or an explicit-shape array with upper and lower limits being given by a constant expression. For example, such an array is assumed that the element count is a constant "100" as given by "INTEGER, DIMENSION(100):: A".

The multi-dimensionalization target array has a larger effect in improving performance based on the multi-dimensionalization when taking a local array allocated to the operating area, a common block entity and a dummy argument and other equivalents than when taking a variable and other equivalent values in a global area having the initial value.

Further, the multi-dimensionalization target array is assumed to be the array that is defined or referred to in the internal loop process but is not updated in the external loop process. Note that the definition is a process of substituting some value into the variable of the array and other equivalents, and is exemplified by an expression like "A(j)= . . . ". On the other hand, the reference is a process of substituting the value of the array and other equivalents into some variable, and is exemplified by an expression like "= . . . A(j)".

FIG. 16 illustrates the example of multi-dimensionalizing the one-dimensional array into the two-dimensional array, and there is, however, no limit to the number of dimensions of the multi-dimensionalization target array. The number of dimensions of the multi-dimensionalization target array may be "2" or more. For example, FIG. 17 is a diagram illustrating an example of a source code to multi-dimensionalizes the two-dimensional array into a three-dimensional array.

A source code designated by "s6" in FIG. 17 is a program before multi-dimensionalizing the array. A k-loop process includes the i-loop process. The i-loop process includes the j-loop process. The j-loop process includes the process of referring to the two-dimensional array AA(j,i).

A source code designated by "s7" in FIG. 17 is a program after multi-dimensionalizing the array. The compiler 2, upon specifying the array AA(j,i) as the multi-dimensionalization target array, multi-dimensionalizes the array AA(j,i) into a three-dimensional array AAA(j,i,k).

Figure 18A:
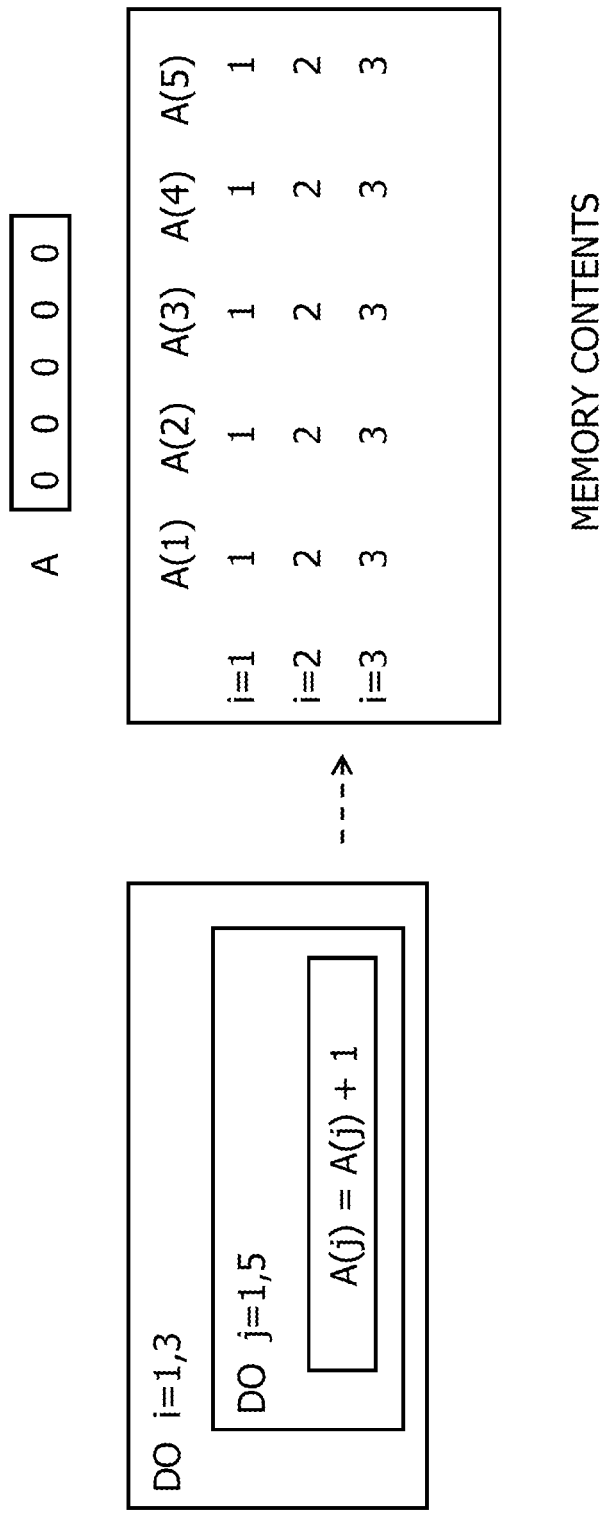
FIG. 18A is a diagram illustrating an example in which the array has a dependency relation between a definition and a reference.
Figure 18B:
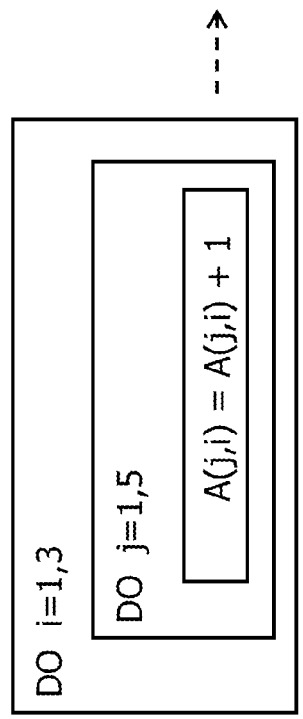
FIG. 18B is a diagram illustrating an example of applying the multi-dimensionalization of the array in the case of FIG. 18A.
Figure 19:
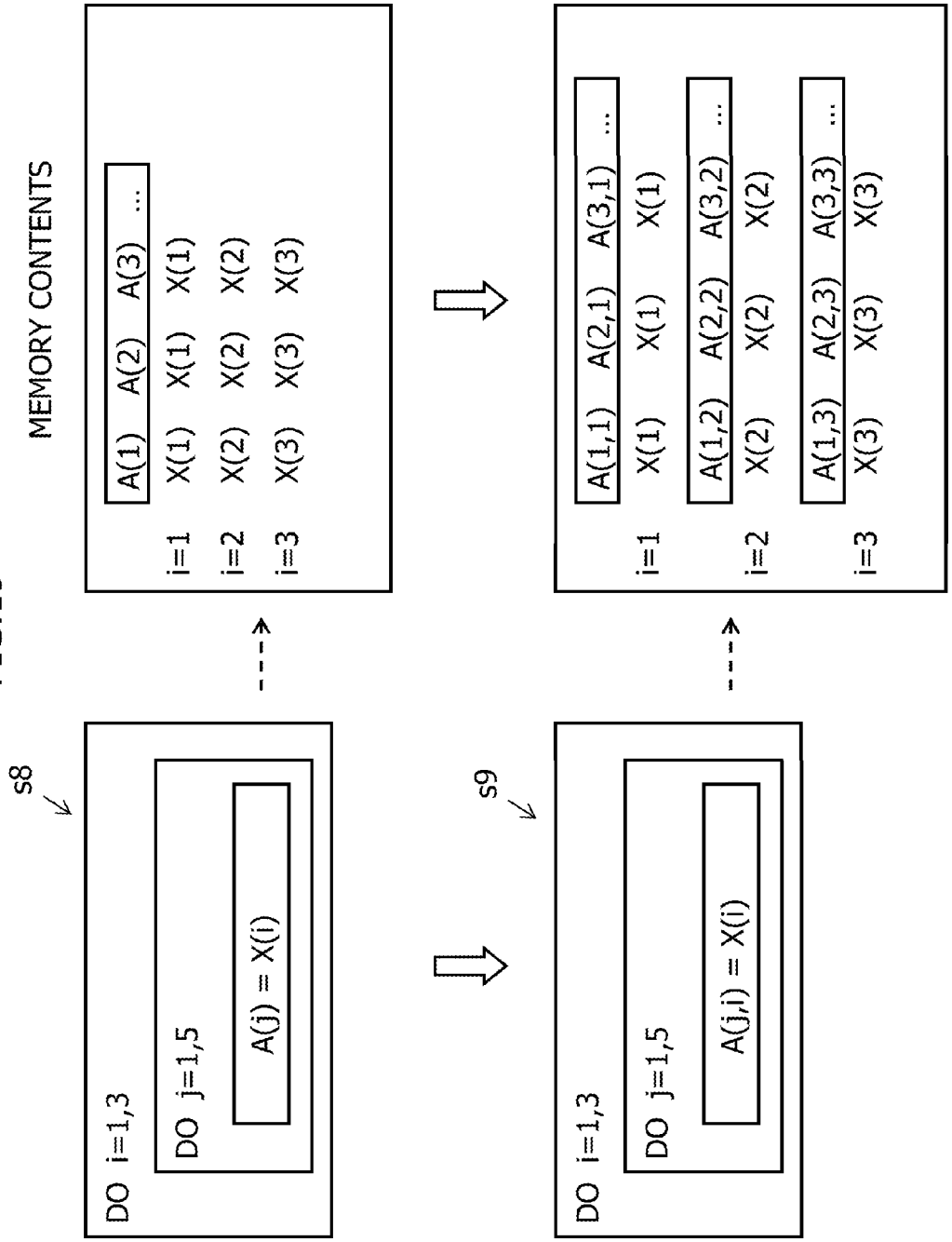
FIG. 19 is a diagram illustrating an example in which the array has no dependency relation between the definition and the reference.

FIGS. 18A through 19 are explanatory diagrams of examples of determining based on the dependency relation between the definition and the reference whether the array is set as the multi-dimensionalization target array. FIG. 18A is the diagram illustrating an example in which the array has the dependency relation between the definition and the reference. In a source code of FIG. 18A, the i-loop process, the control variable "i" of which takes values of "1" through "3", includes the j-loop process. The j-loop process, the variable "j" of which takes values of "1" through "5", includes a process of substituting a value given by A(j)+1 into the array A(j). In other words, in the internal loop process, the dependency relation between the definition and the reference exists in the array A(j). The initial value of each of the elements of the array A(j) is set to "0", in which case the value of each of the elements of the array A(j) becomes "1" when "i" is "1". Further, the value of each of the elements of the array A(j) becomes "2" when "i" is "2". Still further, the value of each of the elements of the array A(j) becomes "3" when "i" is "3".

FIG. 18B is the diagram illustrating an example of applying the multi-dimensionalization of the array in the case of FIG. 18A. A source code in FIG. 18B is a code compiled by multi-dimensionalizing the array A(j) into the array A(j,i) in the source code of FIG. 18A. The initial value of each of the elements of the array A(j,i) is set to "0", in which case the value of each of the elements of the array A(j,i) becomes "1" with respect to each control variable "i", leading to a different result from the case of FIG. 18A.

In the case of FIG. 18A, the area of the same array A(j) is referred to even when the value of the control variable "i" of the external loop varies. On the other hand, in the case of FIG. 18B, the area is ensured per value of the control variable "i" by multi-dimensionalizing the array A(j) into the array A(j,i), and the initial value is set to "0". Therefore, FIG. 18B has a different result from the case of FIG. 18A. Accordingly, the array having the dependency relation between the definition and the reference has the different result due to the multi-dimensionalization as the case may be, and is therefore not set as the multi-dimensionalization target array.

FIG. 19 is the diagram illustrating an example in which the array has no dependency relation between the definition and the reference. A source code designated by "s8" in FIG. 19 includes the same i- and j-loop processes as in FIG. 18A. The j-loop process includes a process of substituting a value of X(i) into the array A(j), i.e., a process of defining the array A(j). The initial value of each of the elements of the array A(j) is set to "0", in which case a value of each of the elements of the array A(j) becomes "X(1) when "i" is "1". Further, the value of each of the elements of the array A(j) becomes "X(2) when "i" is "2". Still further, the value of each of the elements of the array A(j) becomes "X(3) when "i" is "3".

A source code indicated by "s9" in FIG. 19 is a code compiled by multi-dimensionalizing the array A(j) into the array A(j,i) in the source code designated by "s8" in FIG. 19. The initial value of each of the elements of the array A(j,i) is set to "0", in which case the value of each of the elements of the array A(j,1) becomes "X(1)" when "i" is "1". Moreover, the value of each of the elements of the array A(j,2) becomes "X(2)" when "i" is "2". Furthermore, the value of each of the elements of the array A(j,3) becomes "X(3)" when "i" is "3". In other words, the same result as before multi-dimensionalizing the array is obtained. Accordingly, the array having none of the dependency relation between the definition and the reference obtains the same result before and after the multi-dimensionalization, and is therefore set as the multi-dimensionalization target array.

Figure 20:
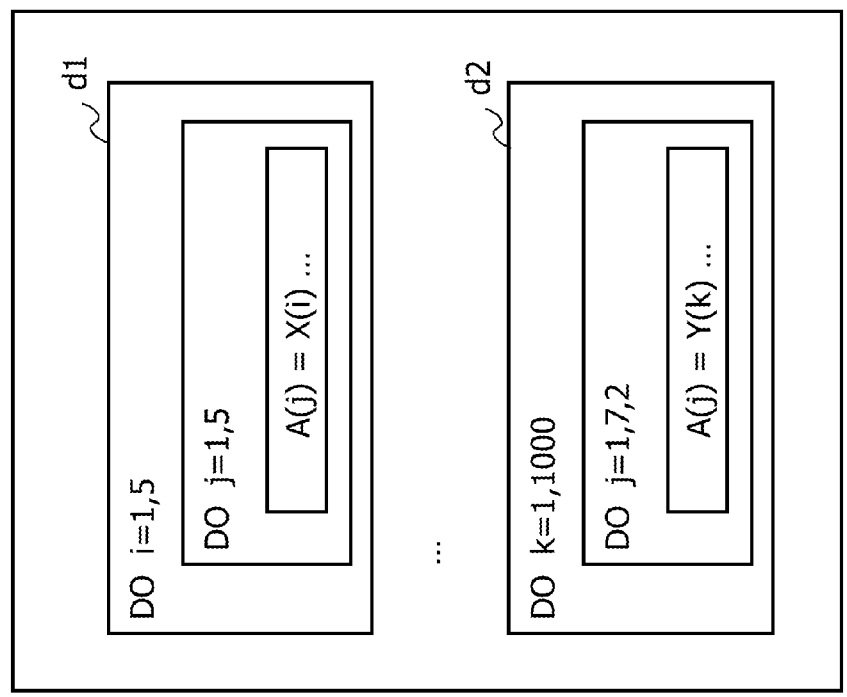
FIG. 20 is a diagram illustrating an example of such a source code that there exists a plurality of loops having the same array but being different in configuration.
Figure 21:
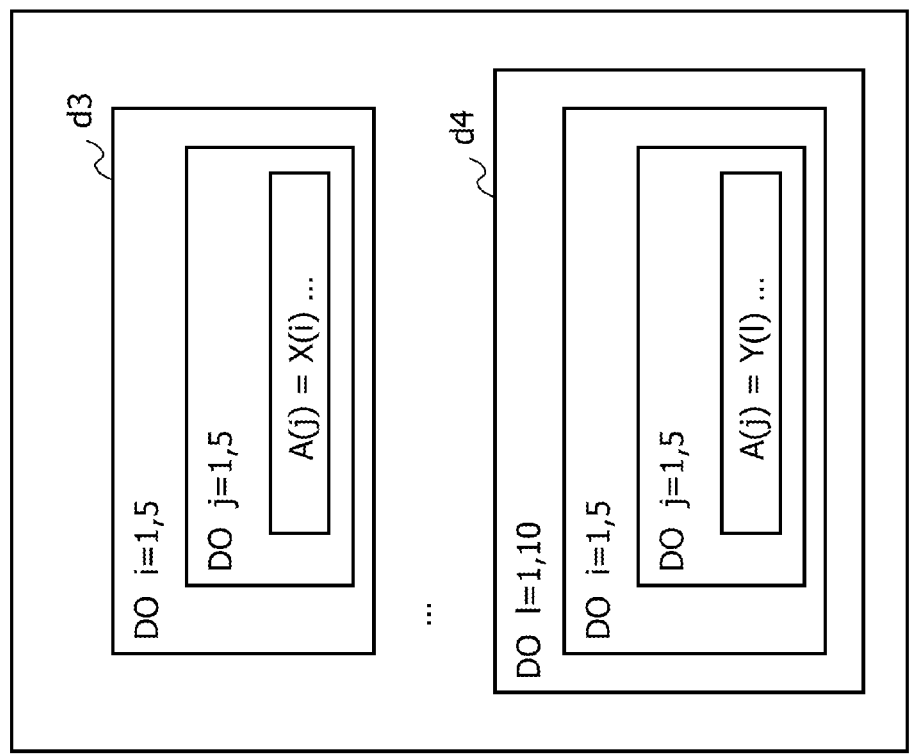
FIG. 21 is a diagram illustrating an example of such a source code that there exists the plurality of loops containing the same array and having the same configuration.

FIGS. 20 and 21 are explanatory diagrams of examples of determining whether the array is set as the multi-dimensionalization target array, the determination being made based on whether the array is contained in a plurality of loop processes each having a different loop configuration. FIG. 20 is the diagram illustrating an example of such a source code that there exists the plurality of loops having the same array but being different in configuration. In a loop process indicated by "d1" in FIG. 20, the i-loop process, the control variable "i" of which takes values of "1" through "5", includes the j-loop process. The j-loop process, the variable "j" of which takes values of "1" through "5", includes a process of substituting an expression containing "X(i)" into the array A(j). On the other hand, in a loop process indicated by "d2" in FIG. 20, the k-loop process, the variable "k" of which takes values of "1" through "100", includes the j-loop process. The j-loop process, the variable "j" of which takes odd-numbered values of "1" through "7", includes a process of substituting an expression containing "X(k)" into the array A(j).

The loop process "d1" is not coincident with the loop process "d2" in terms of the loop rolling count, the increment and the name of control variable of the high-order loop. Thus, when discrepant in loop configuration containing the loop rolling count, the increment, the name of control variable of the high-order loop and other equivalent attributes, the result is different due to the multi-dimensionalization as the case may be, and hence the array is not set as the multi-dimensionalization target array.

FIG. 21 is a diagram illustrating an example of such a source code that there exists a plurality of loops containing the same array and having the same configuration. A loop process designated by "d3" in FIG. 21 is the same as the loop process indicated by "d1" in FIG. 20, and therefore the explanation thereof is omitted. In a loop process designated by "d4" in FIG. 21, an l-loop process, a variable "l" of which takes values of "1" through "10", includes the same i- and j-loop processes as those of the loop process "d3". The j-loop process includes a process of substituting an expression containing "Y(1)" into the array A(j).

The loop process "d3" is different from the loop process "d4" in terms of the number of nest levels of the overall loop process and the value to be substituted into the array A(j), and the i-loop process contained in the loop process "d4" has, however, the same loop configuration as that of the loop process "d3". In this case, the same result is obtained before and the after the multi-dimensionalization of the array, and hence the array is set as the multi-dimensionalization target array.

<Processing Flow>

Figure 22:
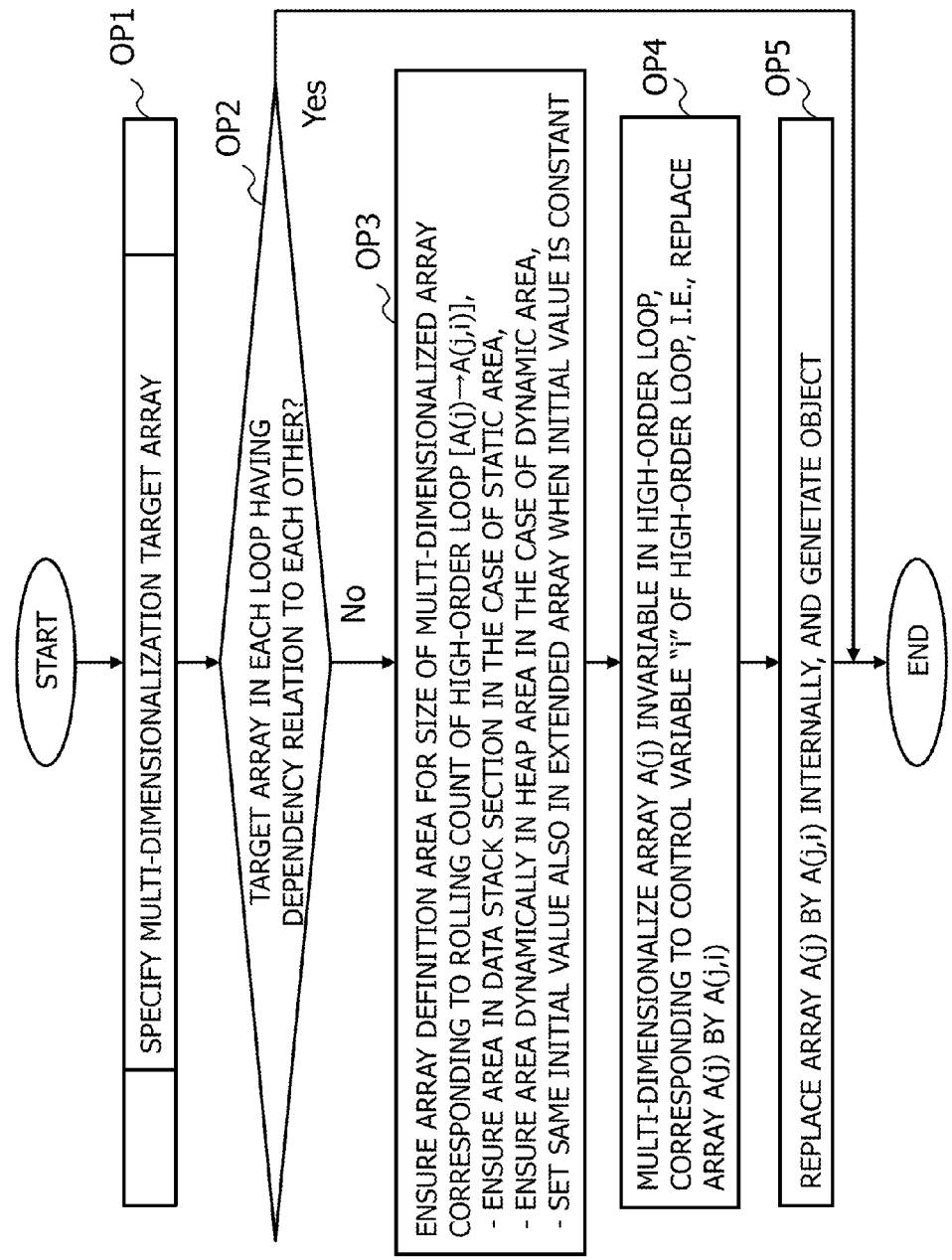
FIG. 22 is one example of a flowchart of a process of generating an object code with a predetermined array being multi-dimensionalized.
Figure 23:
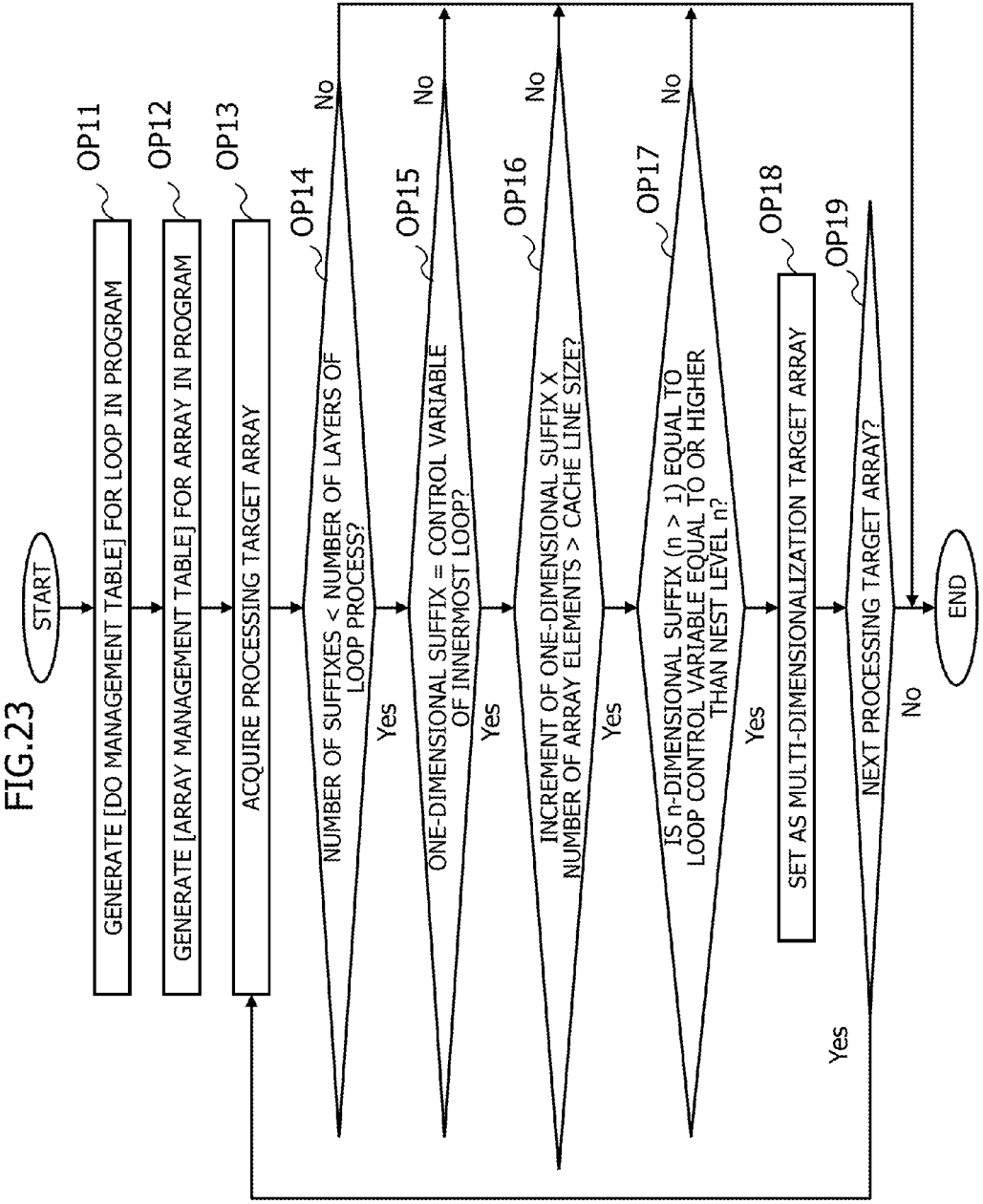
FIG. 23 is one example of a flowchart of a process of specifying the multi-dimensionalization target array.

FIGS. 22 and 23 are explanatory flowcharts of a processing flow in the first embodiment. FIG. 22 is one example of the flowchart of a process of generating an object code compiled by multi-dimensionalizing a predetermined array. The process illustrated in FIG. 22 is started by, e.g., booting the compiler 2.

The compiler 2 specifies the multi-dimensionalization target array through the analyzation unit 22 in OP1. A high-order loop process includes the loop process containing the multi-dimensionalization target array. The multi-dimensionalization target array remains unchanged within the present loop process. Further, the multi-dimensionalization target array is a hardware prefetching target array which accesses to the consecutive area. The process in OP1 is one example of specifying an array structure in a loop process as a hardware prefetching target. Next, the processing advances to OP2.

The compiler 2 in OP2 determines whether or not the multi-dimensionalization target array has an inter-loop dependency relation between the definition and the reference. The compiler 2 determines in OP2 whether the multi-dimensionalization target array has the inter-loop dependency relation between the definition and the reference. When having the dependency relation (OP2: Yes), the process illustrated in FIG. 22 is finished. Whereas when not having the dependency relation (OP2: No), the processing advances to OP3.

In OP3, the compiler 2 ensures the area to define the multi-dimensionalization target array, the area corresponding to a size of the multi-dimensionalized array in accordance with the a high-order loop rolling count. For example, when multi-dimensionalizing the array A(j) into the array A(j,i), the compiler 2 extends the area of the array A(j), corresponding to the high-order loop rolling count. When the array A(j) has a variable of a static area, the area to be extended is ensured in a data stack section. When the array A(j) has a variable of a dynamic area, the area to be extended is dynamically ensured in a heap area and other equivalent areas. When the initial value of the array A(j) is a constant, the compiler 2 sets the same initial value also in the extended array. Next, the processing advances to OP4.

In OP4, the compiler 2 multi-dimensionalizes the array A(j) being invariable in the high-order loop in accordance with the control variable "i" of the high-order loop. In other words, the compiler 2 replaces the array A(j) with the array A(j,i). Subsequently, the processing advances to OP5.

In OP5, the compiler 2 replaces the array A(j) with the array A(j,i) internally, and generate the object. The processes in OP3 through OP5 are one example of a process of generating, from the source program 11, the machine language program 12 in which the array structure is changed so that a second access occurring next to the first access to the array structure refers to an area being consecutive from the area being referred to by the first access. Upon generating the object, the process illustrated in FIG. 22 is finished.

FIG. 23 is one example of a flowchart of a process of specifying the multi-dimensionalization target array. The process illustrated in FIG. 23 is a detailed process in OP1 of FIG. 22. A start of the process illustrated in FIG. 23 is triggered by migrating the processing to the analyzation unit 22 after booting the compiler 2.

In OP11, the analyzation unit 22 generates the DO management table 301 for the respective loop processes in the program. Next, the processing advances to OP12. In OP12, the analyzation unit 22 generates the array management table 311 for each of the arrays in the program. Subsequently, the processing advances to OP13. In OP13, the analyzation unit 22 acquires the processing target array. Next, the processing advances to OP14.

In OP14, the analyzation unit 22 searches the array management table 311 to obtain a value in the "number of suffixes" field about the processing target array. The analyzation unit 22 searches the DO management table 301 to obtain the number of nest levels of the loop process containing the processing target array, i.e., a value in the "nest level" field about the highest-order loop of the loop process containing the processing target array.

The analyzation unit 22 determines whether or not the number of suffixes is smaller than the number of nest levels of the loop process. When the number of suffixes is smaller than the number of nest levels of the loop process (OP14: Yes), the processing advances to OP15. Whereas when the number of suffixes is not smaller than the number of nest levels of the loop process (OP14: No), the processing diverts OP19.

In OP15, the analyzation unit 22 searches the array management table 311 to obtain the suffix of the first dimension of the processing target array, i.e., a value in the "one dimension" field about the processing target array. The analyzation unit 22 further searches the DO management table 301 to obtain a value in the "control variable" field about the innermost loop containing the processing target array.

The analyzation unit 22 determines whether or not the suffix of the first dimension (which will hereinafter be also termed a first-dimensional suffix) is equal to the control variable of the innermost loop. Note that the first-dimensional suffix may be, even when not equal to the control variable of the innermost loop, deemed equal to the control variable of the innermost loop if being a variable propagated from this control variable. When the first-dimensional suffix is equal to the control variable of the innermost loop (OP15: Yes), the processing advances to OP16. Whereas when the first-dimensional suffix is not equal to the control variable of the innermost loop (OP15: No), the processing diverts to OP19.

In OP16, the analyzation unit 22 checks whether the access to the processing target array becomes the access to the consecutive area as the hardware prefetching target array. The hardware prefetching is applied on the cache line basis, and hence, when the size of the area to store the data of the array is not larger than the size of the cache line, the access to the array does not become the access to the consecutive area as the hardware prefetching target array. The size of the area to store the data of the array can be obtained by (Increment×Array Element Count) about, e.g., the first-dimensional suffix.

The analyzation unit 22 determines whether or not a value given by (Increment×Array Element Count) about the first-dimensional suffix is larger than the size of the cache line. When the value given by (Increment×Array Element Count) about the first-dimensional suffix is larger than the size of the cache line (OP16: Yes), the processing advances to OP17. Whereas when value given by (Increment×Array Element Count) about the first-dimensional suffix is not larger than the size of the cache line (OP16: No), the processing diverts to OP19.

In OP17, the analyzation unit 22 checks whether an n-th-dimensional suffix (n>1) is equal to the control variable of the loop process being equal to or higher than a nest level n. To be specific, the analyzation unit 22 searches the array management table 311 to obtain the n-dimensional suffix. The analyzation unit 22 further searches the DO management table 301 and thus checks whether a value of the control variable of the n-th loop is equal to a value of the n-th-dimensional suffix given in the "nest level" field. When not equal, the analyzation unit 22 checks whether a value of the control variable of the (n+1)th loop is equal to the value of the n-dimensional suffix given in the "nest level" field. When not equal, the analyzation unit 22 iterates a process of comparing the control variable of a more external loop with the n-th-dimensional suffix up to the outermost loop, and determines whether the n-th-dimensional suffix (n>1) is equal to the control variable of the loop process being equal to or higher than the nest level n.

When the n-th-dimensional suffix is equal to the control variable of the loop process being equal to or higher than the nest level n (OP17: Yes), the processing advances to OP18. Whereas when the n-th-dimensional suffix is not equal to the control variable of the loop process being equal to or higher than the nest level n (OP17: No), the processing diverts to OP19.

In OP18, the analyzation unit 22 specifies the processing target array as the multi-dimensionalization target array. The specified array may be stored in the form of a multi-dimensionalization target array list in the auxiliary storage device 103 and other equivalent storages. Further, an attribute indicating whether the array is the multi-dimensionalization target array may be defined in the array management table 311, and a value indicating whether the processing target array is the multi-dimensionalization target array may also be stored.

In OP19, the analyzation unit 22 determines whether there is a next processing target array. When there is the next processing target array (OP19: Yes), the processing loops back to OP13. Whereas when there is not the next processing target array (OP19: No), the process illustrated in FIG. 23 comes to an end.

Figure 24:
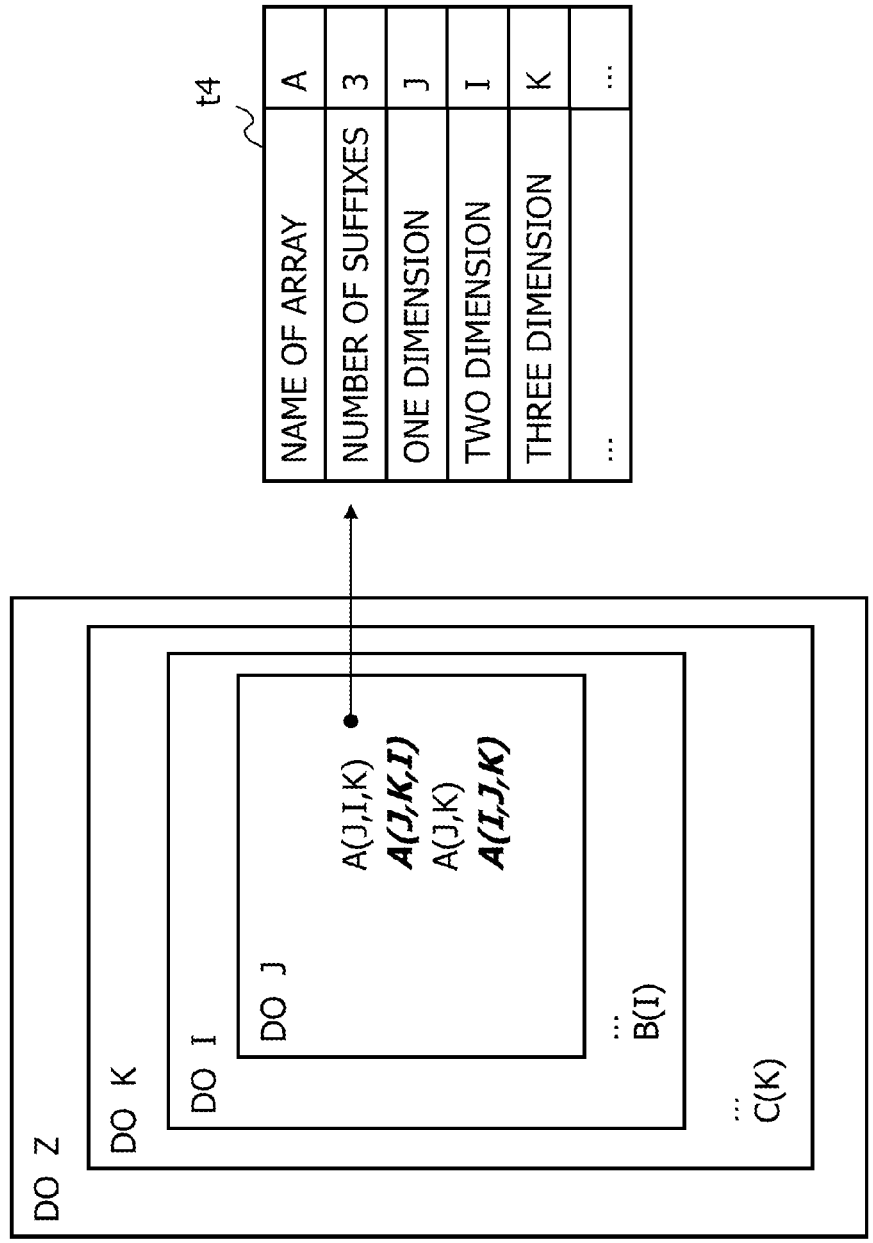
FIG. 24 is a diagram illustrating a specific example of a multi-dimensionalization target array.

FIG. 24 is a diagram illustrating a specific example of the multi-dimensionalization target array. A source code in FIG. 23 contains a description of a Z-loop process. The Z-loop process includes a K-loop process. The K-loop process includes an I-loop process and a process about an array C(K). The I-loop process includes a J-loop process and a process about an array B(I). The J-loop process includes processes about arrays A(J,I,K), A(J,K,I), A(J,K), A(I,J,K).

A table "t4" in FIG. 24 represents a record associated with the array A(J,I,K) in the array management table 311. A value "A" is registered in the "name of array" field; "3" is registered in the "number of suffixes" field; "J" is registered as the control variable of first dimension in the "first dimension" field; "I" is registered as the control variable of second dimension in the "second dimension" field; and "K" is registered as the control variable of third dimension in the "third dimension" field.

When applying the processes in OP14 through OP17 of FIG. 23 to the array A(J,I,K), the number of suffixes is "3", and the number of nest levels of the loop process is "4", thus satisfying conditions in OP14. The first-dimensional suffix is "J", and the control variable of the innermost loop is also "J", thus satisfying conditions in OP15. It is herein assumed that the array A(J,I,K) satisfies conditions in OP16. The second-dimensional suffix "I" is equal to the control variable "I" of the loop with the nest level being "2". The third-dimensional suffix "K" is equal to the control variable "K" of the loop with the nest level being "3". Accordingly, the array A(J,I,K) satisfies conditions in OP17 and is therefore specified as the multi-dimensionalization target array. The array A(J,I,K) is multi-dimensionalized into the array A(J,I,K,Z).

When applying the processes in OP14 through OP17 of FIG. 23 to the array A(J,K,I), the number of suffixes is "3", and the number of nest levels of the loop process is "4", thus satisfying the conditions in OP14. The first-dimensional suffix is "J", and the control variable of the innermost loop is also "J", thus satisfying the conditions in OP15. It is herein assumed that the array A (J,K,I) satisfies the conditions in OP16. The second-dimensional suffix "K" is equal to the control variable "K" of the loop with the nest level being "3". The third-dimensional suffix "I" is equal to the control variable "I" of the loop with the nest level being "2". Therefore, the array A (J,K,I) neither satisfies the conditions in OP17 nor becomes the multi-dimensionalization target array.

Similarly, when applying the processes in OP14 through OP17 of FIG. 23 to the arrays A(J,K) and A(I,J,K), the array A(J,K) is the multi-dimensionalization target array, while the array A(I,J,K) does not become the multi-dimensionalization target array.

<Operational Effect of First Embodiment>

The access to such an array as to access the consecutive area involves repeatedly accessing the same area from the head. In other words, the access to the array loops back to the head of the same area at loop nest switchover timing. The hardware prefetching stops because of not becoming the access to the consecutive area, resulting in occurrence of deterioration of the performance.

In the first embodiment, the compiler 2 changes the accessing method not by accessing the same area from the head per external loop but by multi-dimensionalizing the array and thereby attaining the access to the consecutive areas through the external loop process. The hardware prefetching is thereby continuously operated without any stop, and consequently the data obtained by continuously access the cache memory are supplied beforehand. Hence, an access cost ranging from fetching the data to the reference is reduced, thereby improving the performance.

Further, the compiler 2 decreases concentration of the accesses to the specified cache line, thereby enabling prevention of the cache line conflict with the accesses to other variables. With this contrivance, the occurrence of the cache misses is reduced, thereby ameliorating the performance.

Note that an instruction of calculating the addresses of the array elements per loop results in being deployed by multi-dimensionalizing the array. There is, however, an enhanced effect in improving the performance owing to the read delay being concealed by continuously applying the hardware prefetching rather than the deterioration of the performance due to these instructions.

Second Embodiment

According to a second embodiment, the compiler 2 specifies the multi-dimensionalization target array, based on profile information acquired by executing the program.

There is no cache line conflict between the array which accesses to the consecutive area and another variable, in which case the access data of the last time remain on the cache line when accessing again the array. At this time, the effect of the hardware prefetching is not acquired. While on the other hand, the data on the cache line are swept out by another variable till accessing again the array, in which case the effect of the hardware prefetching is acquired. Thus, the compiler 2 can properly specify the multi-dimensionalization array by making use of execution profile information instanced by a processing status of another variable till accessing again, a cache status and other equivalent information.

Figure 25:
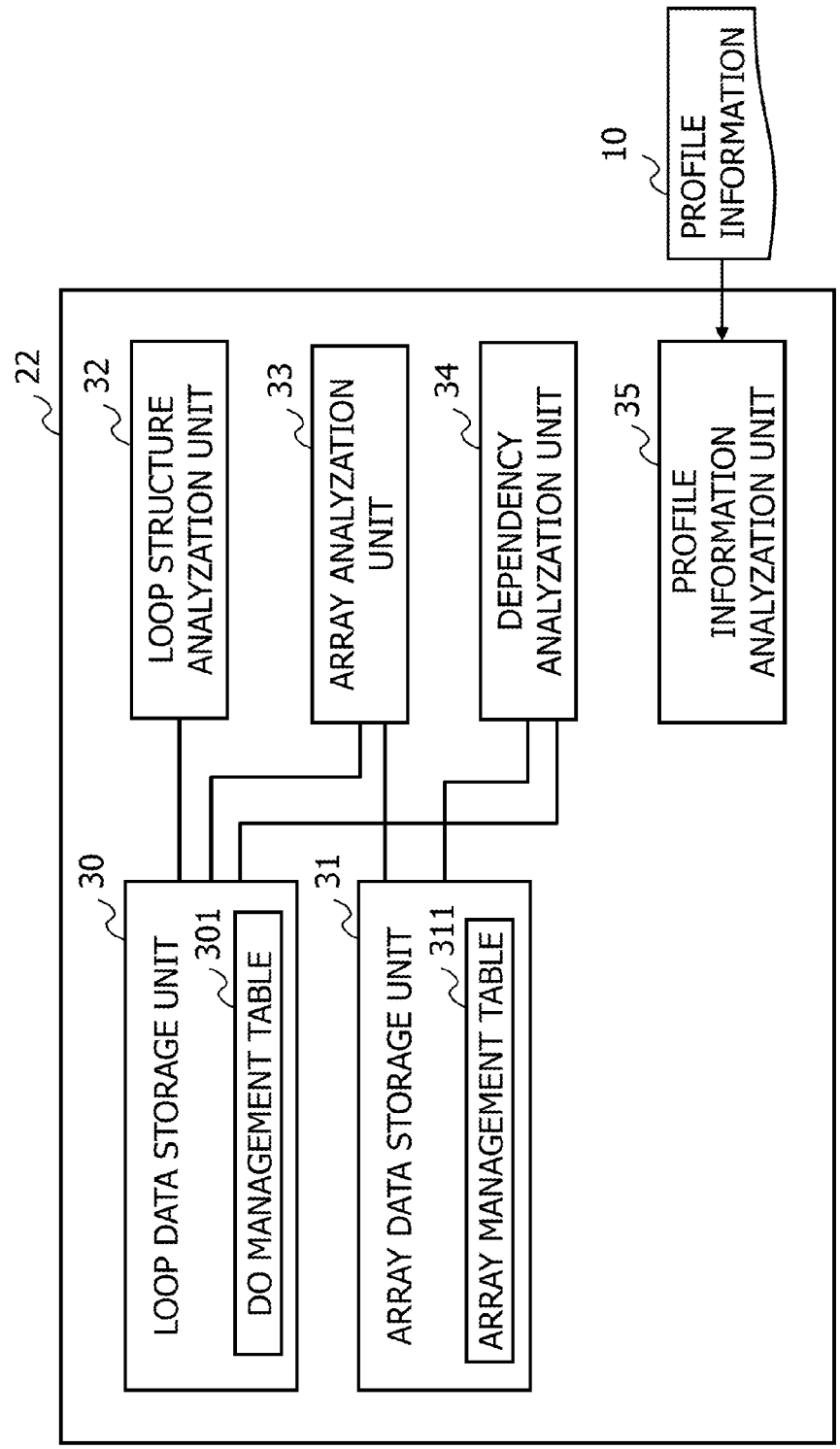
FIG. 25 is a diagram illustrating one example of a processing configuration of the analyzation unit in a second embodiment.

A configuration of the apparatus in the second embodiment is the same as in the first embodiment. FIG. 25 is a diagram illustrating one example of a processing configuration of the analyzation unit 22 in the second embodiment. In FIG. 25, the analyzation unit 22 includes profile information 10 and a profile information analyzation unit 35. Other processing configurations in the second embodiment are the same as those in FIGS. 13 and 14. The second embodiment omits the explanations overlapped with the first embodiment.

The compiler 2 translates the source program 11 by designating a translation option for acquiring the profile information and executes the generated machine language program 12, whereby the profile information 10 is output. The information processing apparatus 1 can execute the generated machine language program 12. Other information processing apparatuses may also execute the generated machine language program 12. In this case, the profile information 10 may also be stored on, e.g., the portable recording medium 110. The profile information analyzation unit 35 can specify the multi-dimensionalization target array, based on the profile information 10 stored on the portable recording medium 110.

The profile information 10 contains, e.g., a length of the area to be accessed consecutively from the array (which will hereinafter be referred to also as a consecutive access length) and an access count of accessing the array. Further, the profile information 10 contains items of information instanced by an access count of another variable to the array and the same cache line, a stride width in the access to be accessed consecutively from the array, and other equivalent information.

The profile information analyzation unit 35 evaluates the effect in improving the performance by analyzing the profile information 10. The effect in improving the performance is calculated by a predetermined evaluation function. The profile information analyzation unit 35 specifies the multi-dimensionalization target array by comparing a value of the evaluation function with a predetermined threshold value.

<Multi-Dimensionalization of Array>

In the second embodiment, the compiler 2 specifies the array to be multi-dimensionalized, based on the profile information 10. FIGS. 26 through 29 are explanatory diagrams of the multi-dimensionalization of the array and the multi-dimensionalization target array.

Figure 26:
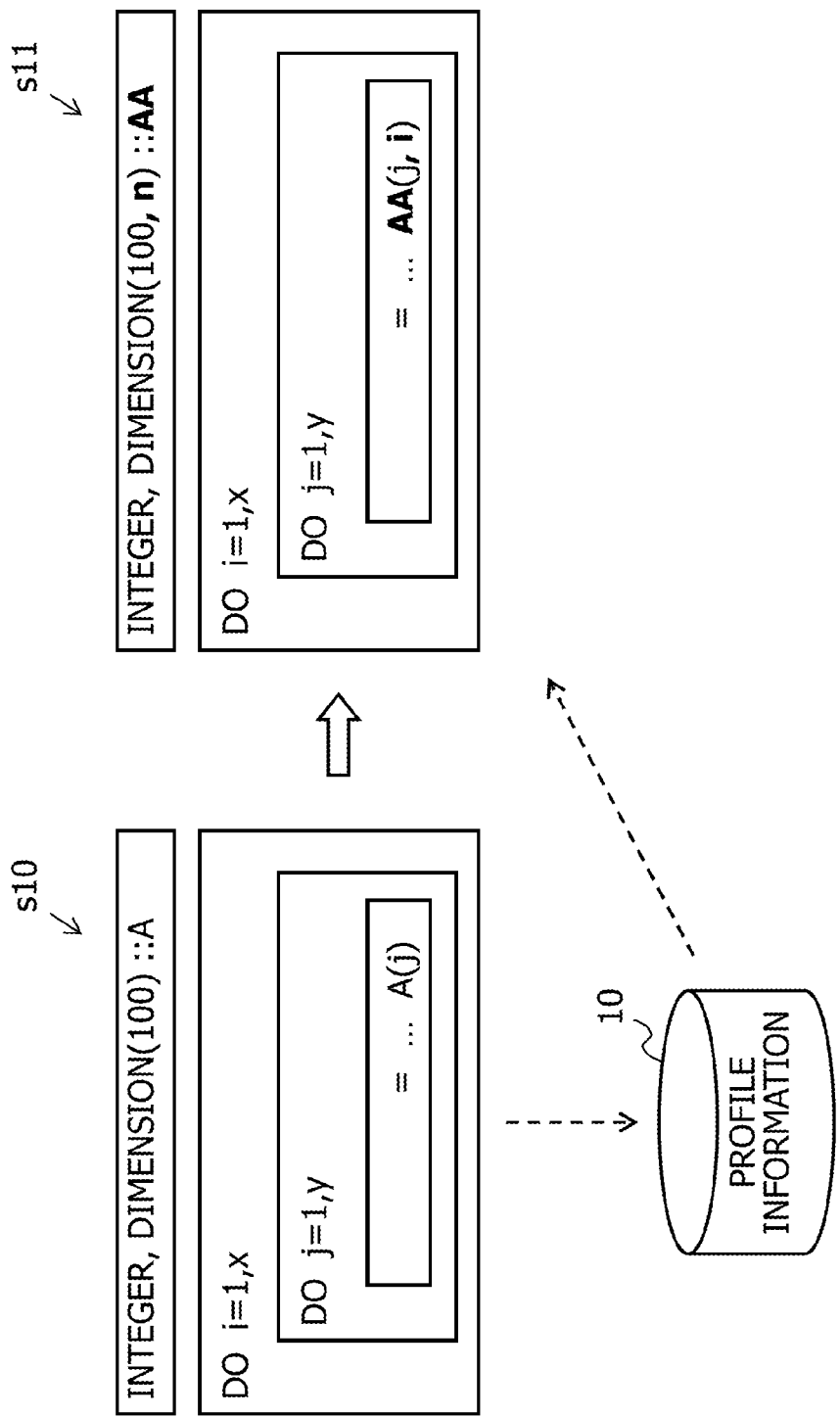
FIG. 26 is a diagram illustrating an example of a source code to multi-dimensionalize the array specified based on profile information by the compiler.

FIG. 26 is the diagram illustrating an example of a source code for multi-dimensionalizing the array specified based on the profile information 10 by the compiler 2. The source code designated by "s10" in FIG. 26 is a program before multi-dimensionalizing the array. The i-loop process, the control variable "i" of which takes values of "1" through "x", is a loop process with the loop rolling count being "x". The i-loop process includes the j-loop process. The j-loop process, the variable "j" of which takes values of "1" through "y", is a loop process with the loop rolling count being "y". The j-loop process includes the process of referring to the array A(j). The array A(j) is the integer type one-dimensional array with the element count being "100". The profile information 10 is output by executing the program "s10".

A source code indicated by "s11" in FIG. 26 is a program after multi-dimensionalizing the array specified based on the profile information 10. The compiler 2, upon specifying the array A(j) as the multi-dimensionalization target array, multi-dimensionalizes the array A(j) into the array AA(j,i). The array AA(j,i) is the (100×n) integer type two-dimensional array. Note that "n" takes the larger value of the loop rolling count "x" of the external i-loop process and the loop rolling count "y" of the internal j-loop process. The compiler 2 deems the program before being multi-dimensionalized as a program after being multi-dimensionalized, and thus translates the program.

FIGS. 27A through 29 are explanatory diagrams of specific examples of specifying the multi-dimensionalization target array, based on the profile information 10. The multi-dimensionalization target array is specified by taking account of, e.g., a density of conflict on the cache line and a cache miss count. The cache line conflict density and the cache miss count can be calculated or acquired from the profile information 10.

FIG. 27A is the diagram illustrating an example of causing the conflict on the cache line. In FIG. 27A, the axis of abscissa indicates an arrangement address, while the axis of ordinates indicates the cache line number L. Data marked with blackened circles are arranged on the second cache line counted from under. Data marked with blackened triangles are arranged on the second cache line counted from under. Data marked with blackened squares are arranged on the second cache line counted from under. In this case, when assuming that the number of Ways is set to "2", the conflict is caused on the cache line, and the data marked with the circles are swept out of the cache line.

FIG. 27B is the diagram illustrating an example of not causing the conflict on the cache line. In FIG. 27B, the axis of abscissa and the axis of ordinates indicate the same as those in FIG. 27A. The data marked with the circles and the triangles are arranged in the same way as in FIG. 27A. Thereafter, no data is arranged on the second cache line counted from under, and hence, when assuming that the number of Ways is set to "2", no conflict is caused on the cache line.

The cache line conflict density is a frequency of how many times the conflict occurs on the cache line to which the multi-dimensionalization target array and another variable are allocated. The conflict density may be set as, e.g., a number of other variables having at least one access to the same cache line for a period till accessing again the data of the array after accessing the same array data. The access counts of other variables can be acquired from the profile information 10.

As in FIG. 27A, the conflict density increases as the conflict count on the cache line rises. As in FIG. 27B, when the conflict does not occur on the cache line, the conflict density becomes smaller than in FIG. 27A. The performance improving effect increases in proportion with the conflict density.

FIG. 28 is the diagram illustrating an example of the occurrence of the cache miss. As the access count to the array area rises, a cache miss occurrence rate increases. Upon the occurrence of the cache miss, the compiler 2 fetches the data directly from the main storage device 102.

The cache miss count is a number of times the data is fetched directly from the main storage device 102 due to the stop of the hardware prefetching. The hardware prefetching is consecutively started along with the multi-dimensionalization of the array, and hence there are a decreased number of times the data are fetched directly from the main storage device 102 due to the cache misses caused by stopping the hardware prefetching, in which case the performance improving effect is expected. In other words, the performance improving effect rises in proportion with the cache miss count.

Further, the cache miss count decreases as a consecutive access length elongates, and is therefore inversely proportional with the consecutive access length. Still further, the cache miss count increases as the access count to the array rises, and is therefore proportional with the access count to the array. Namely, the performance improving effect is inversely proportional with the consecutive access length but is proportional with the access count.

Herein, let R be the conflict density, M be the cache miss count, S be the consecutive access length and L be the access count, and an performance improving effect E can be expressed in the following formula.

$$E = R \times M$$

$$= R \times 1/S \times L$$

The conflict density R is set to the number of other variables having at least one access to the same cache line for the period till accessing again the array data after accessing the same array data. The consecutive access length S and the access count L to the array are acquired from the profile information.

FIG. 29 is the diagram illustrating one example of a data structure of attributes for evaluating the performance improving effect. The compiler 2 acquires these items of attribute data from the profile information 10 and may be stored on the auxiliary storage device 103 and other equivalent storages. In FIG. 29, attribute values of the access count (L), the consecutive access length (S) and the cache conflict density (R) are stored per multi-dimensionalization target array. In FIG. 29, an array "array1" has the access count (L) being "1000", the consecutive access length (S) being "80" and the cache conflict density (R) being "10". Further, an array "array2" has the access count (L) being "2000", the consecutive access length (S) being "40" and the cache conflict density (R) being "20".

The compiler 2 can calculate the performance improving effect by using the attribute data of the multi-dimensionalization target array in the following formula of the evaluation function.

$$\text{Evaluation Function} = \Sigma(L(i)*l(i) + 1/S(i)*s(i) + R(i)*r(i))$$

Coefficients l(i), s(i), r(i) are weight coefficients about the respective attributes and are set to arbitrary values per array. The compiler 2 sets a value of the evaluation function before applying the multi-dimensionalization of the array as a threshold value, and compares a post-applying value with this threshold value. The compiler 2 may set such a combination of arrays that the value of the evaluation function is equal to or larger than the threshold value, as the multi-dimensionalization target arrays. Moreover, the compiler 2 changes, based on the profile information, the combination of multi-dimensionalization target arrays, thereby making it possible to specify such a combination of arrays as to increase the performance improving effect.

Note that the evaluation function given above is not limitative but is one example. The attributes used for the evaluation function are not limited to the access count (L), the consecutive access length (S) and the cache conflict density (R) but may be properly added and combined. Further, the threshold value may be an actually measured value (empirical value) or a logical value acquired by the processor 101 but has no limitation.

<Processing Flow>

Figure 30:
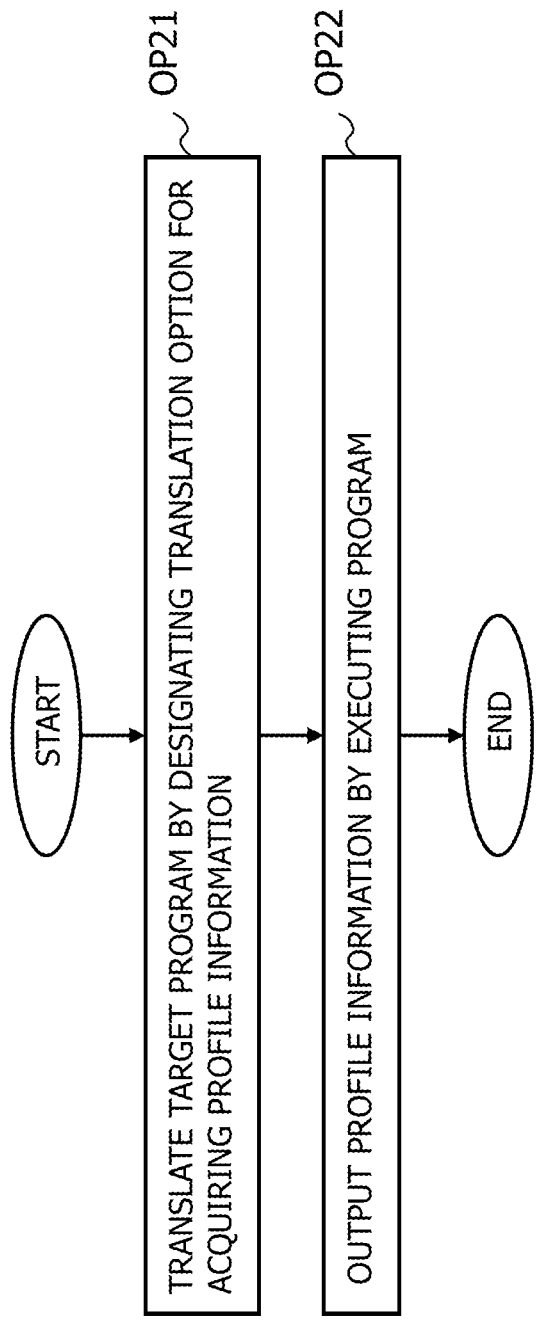
FIG. 30 is a diagram illustrating one example of a flowchart of a process of acquiring the profile information.
Figure 31:
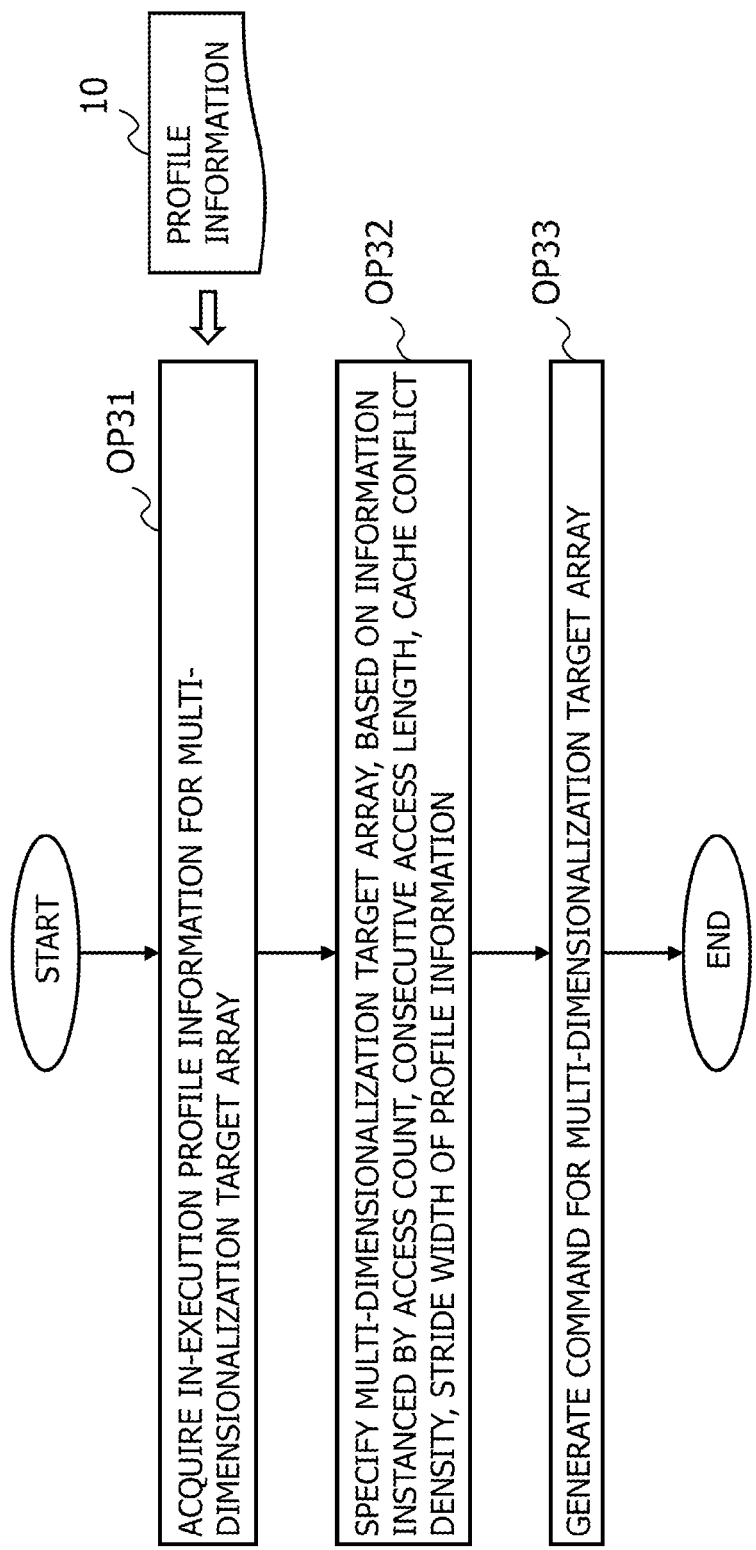
FIG. 31 is a diagram illustrating one example of a flowchart of a process of multi-dimensionalizing the array, based on the profile information.

FIGS. 30 and 31 are explanatory diagrams of a process of multi-dimensionalizing the array, based on the profile information 10. FIG. 30 is one example of a flowchart of a process of acquiring the profile information. A start of the process depicted in FIG. 30 is triggered by booting the compiler 2 along with, e.g., designation of a translation option to give an instruction of acquiring the profile information 10.

In OP21, the compiler 2 translates a target program in accordance with the designation of the translation option for acquiring the profile information. Next, the processing advances to OP22. In OP22, the compiler 2 outputs the profile information by executing the program. The profile information contains, e.g., the access count, the consecutive access length, the cache conflict density, the stride width and other equivalent information of the multi-dimensionalization target array. The multi-dimensionalization target array is such an array as to access the consecutive area and to iterate accessing from the head of the same area per external loop.

FIG. 31 is one example of a flowchart of the process of multi-dimensionalizing the array, based on the profile information. A start of the process depicted in FIG. 31 is triggered by, e.g., booting the compiler 2.

In OP31, the compiler 2 acquires the in-execution profile information about the multi-dimensionalization target array. Next, the processing advances to OP32. In OP32, the compiler 2 specifies the multi-dimensionalization target array, based on the items of information instanced by the access count, the consecutive access length, the cache conflict density, the stride width and other equivalent information of the profile information. Subsequently, the processing advances to OP33. In OP33, the compiler 2 generates the instruction with respect to the multi-dimensionalization target array, thus finishing the process.

<Operational Effect of Second Embodiment>

In the second embodiment, the compiler 2 specifies the multi-dimensionalization target array, based on the profile information obtained by executing the program. With this operation, the compiler 2 specifies the array being expectable to have the performance improving effect as the multi-dimensionalization target array in accordance with processing statuses of other variables, a usage status of the cache memory and other equivalent statuses till accessing again the array, thereby enabling the performance to be improved.

Further, the compiler 2 calculates the performance improving effect with the evaluation function using the values of attributes instanced by the access count, the consecutive access length, the cache conflict density, the stride width and other equivalent information of the array, and specifies a combination of arrays being expectable to have a larger effect as the multi-dimensionalization target arrays, thereby enabling the performance to be improved.

Third Embodiment

According to a third embodiment, the compiler 2 may set an array designated by a user as the multi-dimensionalization target array. The user can select the multi-dimensionalization target array, based on the tuning information 13 that is output by the compiler 2. The user can designate, for the compiler 2, the multi-dimensionalization target array by adding a translation instruction line into the source code. The user can also designate the multi-dimensionalization target array by an option for the compiler 2.

An apparatus configuration in the third embodiment is the same as in the first embodiment. Other processing configurations in the third embodiment are the same as those in the second embodiment. The explanations overlapped with the first and second embodiments are omitted in the third embodiment.

<Multi-Dimensionalization of Array>

According to the third embodiment, the user can designate the multi-dimensionalization target array by adding the translation instruction line into the source code for the compiler 2.

Figure 32:
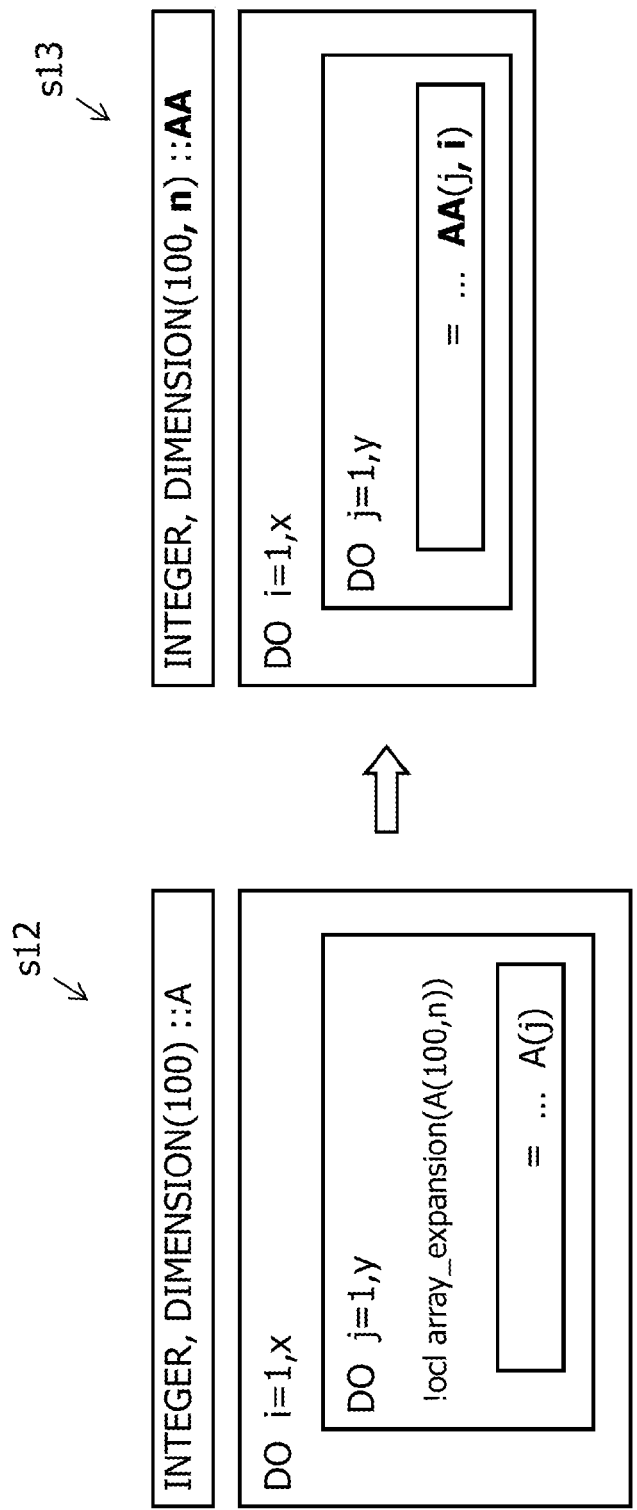
FIG. 32 is a diagram illustrating an example of a source code for multi-dimensionalizing the array specified in a translation instruction line by the user.

FIG. 32 is a diagram illustrating an example of a source code for multi-dimensionalizing the array specified in the translation instruction line by the user. The source code indicated by "s12" in FIG. 32 is a program before multi-dimensionalizing the array. The i-loop process, the control variable "i" of which takes values of "1" through "x", is a loop process with the loop rolling count being "x". The i-loop process includes the j-loop process. The j-loop process, the variable "j" of which takes values of "1" through "y", is a loop process with the loop rolling count being "y". The j-loop process includes a translation instruction line "!ocl array_expansion(A(100, n))". This translation instruction line has a designation that the array A(j) is to be multi-dimensionalized into the (100×n) integer type two-dimensional array. The j-loop process further includes the process of referring to the array A(j). The array A(j) is the integer type one-dimensional array with the element count being "100".

The source code indicated by "s13" in FIG. 32 is a program after multi-dimensionalizing the array. The compiler 2, upon specifying the array A(j) as the multi-dimensionalization target array, multi-dimensionalizes the array A(j) into a (100×n) integer type two-dimensional array AA(j,i). The compiler 2 deems the program before the multi-dimensionalization as a program after the multi-dimensionalization, and thus translates the program.

FIG. 32 illustrates an example of multi-dimensionalizing the one-dimensional array A(j) into the two-dimensional array AA (j,i), and the compiler 2 can likewise, however, multi-dimensionalize a two or higher dimensional array. For example, an array A (i,j,k, . . . ) is replaced by an array AA(A(i,j,k, . . . ), n).

Note that "!ocl" of the translation instruction line represents an instruction given to the compiler and is referred to as a designation of OCL instruction, the instruction being arbitrarily specifiable in the FORTRAN source code by the user. A syntax corresponding to the designation of OCL instruction is a character string beginning with "#pragma" in the C language.

Further, the user can output a machine language program equivalent to the designation of the OCL instruction by designating a predetermined translation option (e.g., -Karray_expansion) for the compiler 2 without designating the OCL instruction in the source code. A description is made herein by exemplifying FORTRAN as the programming language, and, however, other programming languages instanced by the C language may also be used. Moreover, a keyword of the translation option, a name of the control instruction of OCL and other equivalent languages may be arbitrarily set but are not limited to those given above.

<Processing Flow>

Figure 33:
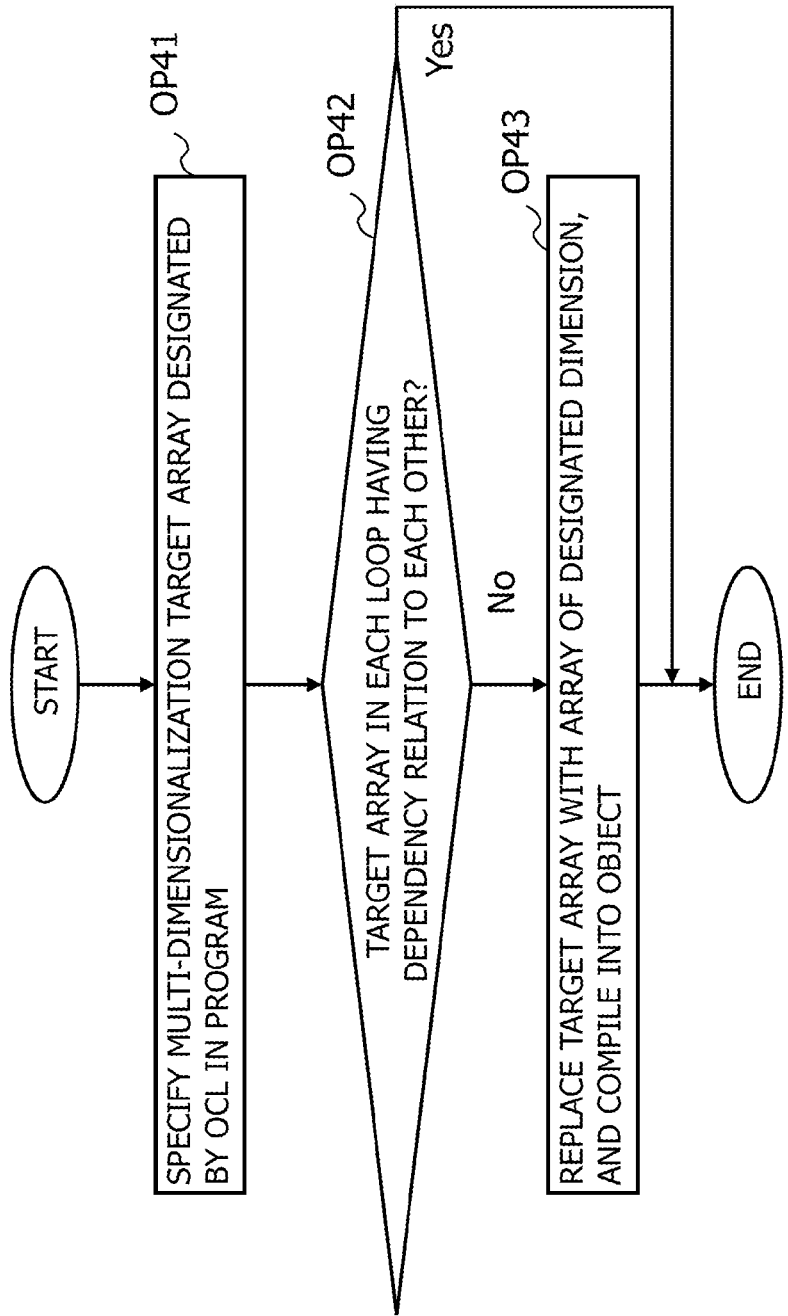
FIG. 33 is a diagram illustrating one example of a flowchart of a process in which the compiler deploys the array designated in the translation instruction line.

FIG. 33 is one example of a flowchart of a process in which the compiler 2 deploys the array designated in the translation instruction line. A start of the process depicted in FIG. 33 is triggered by, e.g., booting the compiler 2.

In OP41, the compiler 2 specifies the multi-dimensionalization array designated in the translation instruction line of OCL and other equivalent languages in the program. Next, the processing advances to OP42. In OP42, the compiler 2 determines whether the dependency relation exists in between the definition and the reference exists in between the present loop and the high-order loop. When the dependency relation exists (OP42: Yes), the process illustrated in FIG. 33 comes to an end. Whereas when the dependency relation does not exist (OP42: No), the processing advances to OP43.

In OP43, the compiler 2 replaces the target array with the array of the designated dimension, and thus deploys the object code. For example, the array A(j) is replaced with the array AA(j,i). Subsequently, the processing comes to an end.

<Operational Effect of Third Embodiment>

The third embodiment enables the compiler 2 to set the array designated by the user as the multi-dimensionalization array. The number of elements of the multi-dimensionalization, the number of dimensions and other equivalent data can be thereby arbitrarily set, and multi-dimensionalization array can be flexibly changed.

Modified Example

The multi-dimensionalization array may be specified by a proper combination of the methods described in the first through third embodiments. With this contrivance, even when the compiler 2 does not handle through the automatic extraction, the multi-dimensionalization array can be flexibly specified by the user's designation on an individual basis.

In the information processing apparatus 1 starting the hardware prefetching upon detecting the access to the consecutive area, each of the embodiments discusses the example of multi-dimensionalizing the array. In this respect, also in the information processing apparatus 1 starting the hardware prefetching upon detecting the access to the area with an expanded stride width at a fixed interval, it is feasible to apply the multi-dimensionalization of the array according to each of the embodiments. The hardware prefetching is consecutively started also for the access to the area with the expanded stride width at the fixed interval.

According to the information processing program, the information processing apparatus 1 and the information processing method of the disclosure, the performance can be improved by expanding the range of applying the hardware prefetching and thereby concealing the read delay due to the cache miss.

<Non-Transitory Recording Medium>

A program configured to cause a computer, other machines and apparatuses (which will hereinafter be referred to as the computer and other equivalent apparatuses) to attain any one of the functions, can be recorded on a non-transitory recording medium readable by the computer and other equivalent apparatuses. Then, the computer and other equivalent apparatuses are made to read and execute the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. Further, a hard disc, a ROM and other equivalent recording mediums are given as the non-transitory recording mediums fixed within the computer and other equivalent apparatuses. Still further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing an information processing apparatus to execute a process, the process comprising:
    analyzing a source program with respect to the information processing apparatus that starts hardware prefetching upon detecting an access to a consecutive area on a main storage device and stops the hardware prefetching upon detecting an end of the access to the consecutive area;
    specifying an array structure in a loop process as a hardware prefetching target;
    first generating, from the source program, a first machine language program in which the array structure is not changed; and
    second generating, from the source program, a second machine language program in which the array structure is changed so that a second access occurring next to a first access to the array structure refers to an area being consecutive from the area being referred to by the first access,
    the specifying includes specifying the array structure based on profile information about program performance, the profile information being acquired by executing the first machine language program in which the array structure is not changed.

2. The non-transitory computer-readable recording medium according to claim 1, wherein the profile information contains at least one of an access count to the array structure, a size of an area for storing the array structure and an access status from another variable to the area on a cache memory to store the array structure.

3. The non-transitory computer-readable recording medium according to claim 1, wherein the specifying specifies the array structure on the basis of a command-based instruction in the source program or an option-based instruction when executing the machine language program.

4. The non-transitory computer-readable recording medium according to claim 1, wherein the analyzing analyzes the source program when the information processing apparatus starts the hardware prefetching upon detecting an access to an area on the main storage device at a fixed interval of stride width and stops the hardware prefetching upon detecting an end of the access to the area at the fixed interval of stride width, and the specifying specifies the array structure in the loop process as the hardware prefetching target.

5. An information processing apparatus configured to start hardware prefetching upon detecting an access to a consecutive area on a main storage device and to stop the hardware prefetching upon detecting an end of the access to the consecutive area, the information processing apparatus comprising:
    a processor, and
    a memory storing a program causing the processor to execute:
        analyzing a source program;
        specifying an array structure in a loop process as a hardware prefetching target;
        first generating, from the source program, a first machine language program in which the array structure is not changed; and
        second generating, from the source program, a second machine language program in which the array structure is changed so that a second access occurring next to a first access to the array structure refers to an area being consecutive from the area being referred to by the first access, the specifying includes specifying the array structure based on profile information about program performance, the profile information being acquired by executing the first machine language program in which the array structure is not changed.

6. An information processing method comprising:

analyzing a source program with respect to an information processing apparatus that starts hardware prefetching upon detecting an access to a consecutive area on a main storage device and stops the hardware prefetching upon detecting an end of the access to the consecutive area;

specifying an array structure in a loop process as a hardware prefetching target;

first generating, from the source program, a first machine language program in which the array structure is not changed; and second generating, from the source program, a second machine language program in which the array structure is changed so that a second access occurring next to a first access to the array structure refers to an area being consecutive from the area being referred to by the first access, the specifying includes specifying the array structure based on profile information about program performance, the profile information being acquired by executing the first machine language program in which the array structure is not changed.

* * * * *